US010000591B2

(12) United States Patent
Batinas-Geurts et al.

(10) Patent No.: US 10,000,591 B2
(45) Date of Patent: Jun. 19, 2018

(54) CATALYST SYSTEM FOR POLYMERIZATION OF AN OLEFIN

(71) Applicants: Saudi Basic Industries Corporation, Riyadh (SA); Sabic Global Technologies B.V., Bergen op Zoom (NL)

(72) Inventors: Aurora Alexandra Batinas-Geurts, BK Sittard (NL); Martin Alexander Zuideveld, Kelmis (BE); Raymond Gerlofsma, Brunssum (NL); Henrica Norberta Alberta Maria Steenbakkers-Menting, Jodenstraat (NL); Peter Degenhart, Echt (NL)

(73) Assignees: SAUDI BASIC INDUSTRIES CORPORATION, Riyadh (SA); SABIC GLOBAL TECHNOLOGIES B.V., Bergen Op Zoom (NL)

(*) Notice: Subject to any disclaimer, the term of this patent is extended or adjusted under 35 U.S.C. 154(b) by 0 days. days.

(21) Appl. No.: 15/106,061

(22) PCT Filed: Dec. 19, 2014

(86) PCT No.: PCT/EP2014/078795
§ 371 (c)(1),
(2) Date: Jun. 17, 2016

(87) PCT Pub. No.: WO2015/091981
PCT Pub. Date: Jun. 25, 2015

(65) Prior Publication Data
US 2016/0311950 A1  Oct. 27, 2016

(30) Foreign Application Priority Data

Dec. 20, 2013 (EP) ..................... 13199169
Jun. 2, 2014 (EP) ..................... 14170828

(51) Int. Cl.
C08F 210/06 (2006.01)
C08F 110/06 (2006.01)
C08L 23/12 (2006.01)

(52) U.S. Cl.
CPC .......... *C08F 210/06* (2013.01); *C08F 110/06* (2013.01); *C08L 23/12* (2013.01); C08L 2207/02 (2013.01)

(58) Field of Classification Search
None
See application file for complete search history.

(56) References Cited

U.S. PATENT DOCUMENTS

| 4,211,670 | A | 7/1980 | Vandenberg |
| 4,384,087 | A | 5/1983 | Capshew |
| 4,399,054 | A | 8/1983 | Ferraris et al. |
| 4,414,132 | A | 11/1983 | Goodall et al. |
| 4,472,524 | A | 9/1984 | Albizzati |
| 4,771,024 | A | 9/1988 | Nestlerode et al. |
| 4,866,022 | A | 9/1989 | Arzoumanidis et al. |
| 4,978,648 | A | 12/1990 | Barbe et al. |
| 5,077,357 | A | 12/1991 | Job |
| 5,093,415 | A | 3/1992 | Brady, III et al. |
| 5,106,806 | A | 4/1992 | Job |
| 5,556,820 | A | 9/1996 | Funabashi et al. |
| 5,567,665 | A | 10/1996 | Wagner et al. |
| 6,395,670 | B1 | 5/2002 | Morini et al. |
| 6,825,146 | B2 | 11/2004 | Kilty et al. |
| 7,238,758 | B2 | 7/2007 | Yoshikiyo et al. |
| 9,663,596 | B2 | 5/2017 | Taftaf et al. |
| 9,688,790 | B2 | 6/2017 | Taftaf et al. |

(Continued)

FOREIGN PATENT DOCUMENTS

CN  101104656  1/2008
DE  1745117  2/1970

(Continued)

OTHER PUBLICATIONS

Bartoli et al. "Convenient Procedure for the Reduction of p-Enamino Ketones: Synthesis of y-Amino Alcohols and Tetrahydro-I ,3-oxazines" Journal of the Chemical Society, Perkin Transactions 1, 1994; 537-543.
Carl Hanser Verlag Munich "Current Processes" Polypropylene handbook Pasquini, N editor, 2005:6.2.
Emil White, "Deamination of Amines. 2-Phenylethyl Benzoate Via the Nitrosoamide Decomposition" Organic Syntheses, 1967 47():44.
English Abstract only of CN 101,104,656.
International Search Report for International Application No. PCT/EP2014/078795, international filing date Dec. 19, 2014, dated Jun. 26, 2015, 6 pages.

(Continued)

*Primary Examiner* — Catherine S Branch
(74) *Attorney, Agent, or Firm* — Cantor Colburn LLP

(57) ABSTRACT

A process for the preparation of a catalyst system for olefin polymerization, including: A) providing said procatalyst obtainable via a process comprising: i) contacting a compound $R^4_z MgX^4_{2-z}$ with an alkoxy- or aryloxy-containing silane compound to give a first intermediate reaction product, ii) optionally contacting the solid product obtained in step i) with at least one activating compound selected from an activating electron donor or metal alkoxide compound; iii) contacting the first or second intermediate reaction product, with a halogen-containing Ti-compound and optionally an internal electron donor to obtain the procatalyst; and B) contacting the procatalyst with a co-catalyst and at least diethylaminotriethoxysilane as the external donor. Further disclosed is a catalyst system obtained by the process; a process for preparing a polyolefin by contacting at least one olefin with the catalyst system; a polyolefin obtained thereby; a composition comprising a propylene-ethylene copolymer; a shaped article thereof; and use of the polyolefin.

17 Claims, No Drawings

(56) References Cited

U.S. PATENT DOCUMENTS

| | | |
|---|---|---|
| 2004/0235643 A1 | 11/2004 | Vitale et al. |
| 2005/0032991 A1 | 2/2005 | Chosa et al. |
| 2008/0312389 A1 | 12/2008 | Ramjoie et al. |
| 2009/0203863 A1 | 8/2009 | Chen |
| 2009/0306315 A1 | 12/2009 | Ramjoie et al. |
| 2010/0130709 A1 | 5/2010 | Chen et al. |
| 2010/0168353 A1* | 7/2010 | Sheard .................. C08F 10/06 526/191 |
| 2013/0030100 A1 | 1/2013 | Van Heeringen et al. |
| 2016/0311945 A1 | 10/2016 | Siddiqui et al. |
| 2016/0311946 A1 | 10/2016 | Zuideveld et al. |
| 2016/0311947 A1 | 10/2016 | Zuideveld et al. |
| 2016/0326280 A1 | 11/2016 | Batinas-Geurts et al. |
| 2016/0333121 A1 | 11/2016 | Batinas-Geurts et al. |
| 2016/0340293 A1 | 11/2016 | Taftaf et al. |

FOREIGN PATENT DOCUMENTS

| | | |
|---|---|---|
| EP | 0019330 A1 | 11/1980 |
| EP | 398698 A2 | 11/1990 |
| EP | 0398698 A2 | 11/1990 |
| EP | 9632426 A1 | 10/1996 |
| EP | 0799839 A2 | 10/1997 |
| EP | 0841348 A2 | 5/1998 |
| EP | 1086961 A1 | 5/2001 |
| EP | 1270651 A1 | 1/2003 |
| EP | 1273595 A1 | 1/2003 |
| EP | 1283222 A1 | 2/2003 |
| EP | 1222214 B1 | 7/2004 |
| EP | 1538167 A1 | 6/2005 |
| EP | 1717269 A1 | 11/2006 |
| EP | 1783145 A1 | 5/2007 |
| EP | 1862480 A1 | 12/2007 |
| EP | 1838741 B1 | 4/2011 |
| GB | 1128724 | 10/1968 |
| JP | 2008106089 A | 8/2008 |
| WO | 9632427 A1 | 10/1996 |
| WO | 0123441 A1 | 4/2001 |
| WO | 02070569 A1 | 9/2002 |
| WO | 03068828 A1 | 8/2003 |
| WO | 2006010414 A1 | 2/2006 |
| WO | 2006056338 A1 | 6/2006 |
| WO | 2007134851 A1 | 11/2007 |
| WO | 200807770 A1 | 7/2008 |
| WO | 2011106494 A1 | 9/2011 |
| WO | 2011106497 A1 | 9/2011 |
| WO | 2011106500 A1 | 9/2011 |
| WO | 2012041810 A1 | 4/2012 |
| WO | 2012139897 A1 | 10/2012 |
| WO | 2013124063 A1 | 8/2013 |
| WO | 2014001257 A1 | 1/2014 |
| WO | 2015091983 A1 | 6/2016 |

OTHER PUBLICATIONS

Pullukat, Thomas J. and Hoff, Raymond E., "Silica-Based Ziegler—Natta Catalysts: A Patent Review", Catal. Rev.—Sci. Eng., 41(3 &4), 389-428 (1999).

S. Van Der Ven, Polypropylene and other Polyolefins, Elsevier 1990.

Written Opinion of the International Searching Authority for International Application No. PCT/EP2014/078795, international filing date of Dec. 19, 2014, dated Jun. 26, 20015, 7 pages.

"Perodic System of the Elements," Handbook of Chemistry and Physics, CRC Press; 1989-1990, 70th Edition.

International Search Report Authority for PCT/EP2014/078790 dated Mar. 17, 2015, 4 pages.

International Search Report for International Application No. PCT/EP2014/078794, international filing date Dec. 19, 2014, dated Mar. 12, 2015, 3 pages.

International Search Report for International Application No. PCT/EP2014/078796, international filing date Dec. 19, 2014, dated Jun. 11, 2015, 7 pages.

International Search Report for international Application PCT/EP2014/078797, filing date Dec. 19, 2014, dated Mar. 20, 2015, 3 pages.

International Search Report for PCT/EP2014/078798 dated Mar. 12, 2015, 4 pages.

International Search Report of International Application No. PCT/EP2014/078718, filing date Dec. 19, 2014, dated Mar. 11, 2015, 4 pages.

Pasquini, N(ed.) "Polypropylene handbook," Carl Hanser Verlag Munich; 11 Pages, 2nd edition, Chapter 6.2.

Written Opinion of the International Searching Authority for International Application No. PCT/EP2014/078718, filing date Dec. 19, 2014, dated Mar. 11, 2015, 6 pages.

Written Opinion of the International Searching Authority for International Application No. PCT/EP2014/078796, international filing date Dec. 19, 2014, dated Jun. 11, 2015, 7 pages.

Written Opinion of the International Searching Authority for International Application No. PCT/EP2016/078794, international filing date Dec. 19, 2014, dated Mar. 12, 2015 4 pages.

Written Opinion of the International Searching Authority for PCT/EP2014/078790 dated Mar. 17, 2015, 4 pages.

Written Opinion of the International Searching Authority for PCT/EP2014/078798 dated Mar. 12, 2015, 6 pages.

Written Opinion of the International Searching Authority of International Application No. PCT/EP2014/078797, filing date Dec. 19, 2014, dated Mar. 20, 2015, 5 pages.

* cited by examiner

CATALYST SYSTEM FOR POLYMERIZATION OF AN OLEFIN

This application is a national stage application of PCT/EP2014/078795 filed Dec. 19, 2014, which claims priority to European Application EP14170828.9 filed Jun. 2, 2014, and European Application EP13199169.7 filed Dec. 20, 2013, all of which are hereby incorporated by reference in their entirety.

The present invention relates to a catalyst system comprising a Ziegler-Natta type procatalyst, a co-catalyst and one or more external electron donors.

The catalyst system of the present invention is suitable for the polymerization of olefins. The invention also relates to a process for obtaining a polyolefin by applying said catalyst system and to a polyolefin obtainable by said process. In addition, the present invention relates to use of said polyolefin.

Catalyst systems and their components that are suitable for preparing a polyolefin are generally known. One type of such catalysts are generally referred to as Ziegler-Natta catalysts. The term "Ziegler-Natta" is known in the art and it typically refers to catalyst systems comprising a transition metal-containing solid catalyst compound (also typically referred to as a procatalyst); an organometallic compound (also typically referred to as a co-catalyst) and optionally one or more electron donor compounds (e.g. external electron donors).

The transition metal-containing solid catalyst compound comprises a transition metal halide (e.g. titanium halide, chromium halide, hafnium halide, zirconium halide, vanadium halide) supported on a metal or metalloid compound (e.g. a magnesium compound or a silica compound). An overview of such catalyst types is for example given by T. Pullukat and R. Hoff in Catal. Rev.—Sci. Eng. 41, vol. 3 and 4, 389-438, 1999. The preparation of such a procatalyst is for example disclosed in WO96/32427 A1.

EP 1 783 145 discloses an dialkylamine trialkoxysilane external donor and the use thereof in olefin polymerization using catalysts. US 2005/202958 discloses an dialkylamine trialkoxysilane external donor and the use thereof in olefin polymerization using catalysts. US 2005/032991 discloses discloses an dialkylamine trialkoxysilane external donor and the use thereof in olefin polymerization using catalysts. WO 2013/019351 discloses semi-crystalline polyolefin compsitions comprising a thermoplastic crystallizable polyolefin and one or more di-alkyl bis-oxalamide compounds. EP 1 270 651 discloses polymer films comprising polypropylene random copolymers.

Polyolefins are known to emit volatiles. The volatile fraction of a polymer is associated with the content of oligomers. Emissions of volatiles from polymers are associated with environmental risks and health risks. Hence, there is an ongoing need in the industry to reduce the volatile fraction in polymers.

For polyolefins, it is important to be able to tune the properties of the polyolefin materials, and in particular to obtain combinations of desirable properties and reduce unwanted properties, depending on the application intended. This is a problem, as optimizing one property of the polyolefin often results in the diminishing of other properties or the occurrence of unwanted side effects. With respect to volatiles, it is desirable to reduce the volatile fraction in a polymer while maintaining the mechanical properties.

Another problem that may occur with polymers is blooming. Blooming is not desired, since it will negatively affect the optical appearance of an article prepared with said composition. Another problem that may occur is static electricity, which is discussed in detail below.

Hence, it is thus an object of the invention to provide an improved catalyst system for the polymerization of olefins and to a process to prepare such a system.

It is a further object of the present invention to provide a procatalyst which shows better performance in polymerization of olefins.

It is yet another object of the invention to reduce volatiles in poleolefins and/or to reduce the static effect. It is of particular interest to reduce volatiles while retaining the mechanical properties of the polyolefin.

It is another object of the invention to provide a catalyst system that reduces or avoids blooming in polyolefins. It is of particular interest to reduce blooming while controlling other parameters of the polymer, such as the xylene soluble fraction, which affects certain mechanical properties of the polymer.

One or more of the aforementioned objects of the present invention are achieved by the various aspects of the present invention.

The present invention is related to the use of alkoxy alkylamino-silanes, especially diethylamine triethoxysilane (DEATES) as internal donors in a Ziegler-Natta catalyst system.

It has surprisingly been found by the present inventors that the external donor according to the present invention shows a lower emission and reduces statics.

SUMMARY OF THE INVENTION

In a first aspect, the present invention relates to a process for the preparation of a catalyst system suitable for olefin polymerization, said process comprising the steps of:

A) providing said procatalyst obtainable via a process comprising the steps of:
  i) contacting a compound $R^4_z MgX^4_{2-z}$ with an alkoxy- or aryloxy-containing silane compound to give a first intermediate reaction product, being a solid $Mg(OR^1)_x X^1_{2-x}$, wherein: $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has between 1 and 20 carbon atoms; $X^4$ and $X^1$ are each independently selected from the group of consisting of fluoride (F—), chloride (Cl—), bromide (Br—) or iodide (I—), preferably chloride; z is in a range of larger than 0 and smaller than 2, being $0<z<2$;
  ii) optionally contacting the solid $Mg(OR^1)_x X^1_{2-x}$ obtained in step i) with at least one activating compound selected from the group formed of activating electron donors and metal alkoxide compounds of formula $M^1(OR^2)_{v-w}(OR^3)_w$ or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has between 1 and 20 carbon atoms;

iii) contacting the first or second intermediate reaction product, obtained respectively in step i) or ii), with a halogen-containing Ti-compound and optionally an internal electron donor to obtain said procatalyst;

B) contacting said procatalyst with a co-catalyst and the at least one external electron donor being diethylaminotriethoxysilane (DEATES) according to Formula III.

In an embodiment, said process is essentially phthalate free.

In an embodiment of said process the optional internal electron donor is an aminobenzoate according to Formula XI

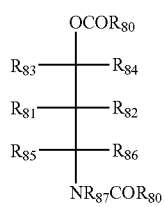

Formula XI wherein:

$R^{80}$, $R^{81}$, $R^{82}$, $R^{83}$, $R^{84}$, $R^{85}$, and $R^{86}$ are independently selected from a group consisting of hydrogen, $C_1$-$C_{10}$ straight and branched alkyl; $C_3$-$C_{10}$ cycloalkyl; $C_6$-$C_{10}$ aryl; and $C_7$-$C_{10}$ alkaryl and aralkyl group;

wherein $R^{81}$ and $R^{82}$ are each a hydrogen atom and $R^{83}$, $R^{84}$, $R^{85}$ and $R^{86}$ are independently selected from a group consisting of $C_1$-$C_{10}$ straight and branched alkyl; $C_3$-$C_{10}$ cycloalkyl; $C_6$-$C_{10}$ aryl; and $C_7$-$C_{10}$ alkaryl and aralkyl group, preferably from $C_1$-$C_{10}$ straight and branched alkyl and more preferably from methyl, ethyl, propyl, isopropyl, butyl, t-butyl, phenyl group;

wherein when one of $R^{83}$ and $R^{84}$ and one of $R^{85}$ and $R^{86}$ has at least one carbon atom, then the other one of $R^{83}$ and $R^{84}$ and of $R^{85}$ and $R^{86}$ is each a hydrogen atom;

wherein $R^{87}$ is selected from a group consisting of hydrogen, methyl, ethyl, propyl, isopropyl, butyl, t-butyl, phenyl, benzyl, substituted benzyl and halophenyl group; and wherein $R^{80}$ is selected from the group consisting of $C_6$-$C_{10}$ aryl; and $C_7$-$C_{10}$ alkaryl and aralkyl group; preferably, $R^{80}$ is substituted or unsubstituted phenyl, benzyl, naphthyl, ortho-tolyl, para-tolyl or anisol group, and more preferably $R^{80}$ is phenyl, preferably wherein the optional internal electron donor is selected from the group consisting of 4[benzoyl(methyl)amino]pentan-2-yl benzoate; 2,2,6,6-tetramethyl-5-(methylamino)heptan-3ol dibenzoate; 4-[benzoyl (ethyl)amino]pentan-2-yl benzoate, 4-(methylamino) pentan-2-yl bis (4-methoxy)benzoate), 3-[benzoyl (cyclohexyl)amino]-1-phenylbutyl benzoate, 3[benzoyl (propan-2-yl)amino]-1-phenylbutyl, 4-[benzoyl(methyl) amino]-1,1,1-trifluoropentan-2-yl, 3-(methylamino)-1,3-diphenylpropan-1-ol dibenzoate, 3-(methyl)amino-propan-1-ol dibenzoate; 3-(methyl)amino-2,2-dimethylpropan-1-ol dibenzoate, and 4-(methylamino)pentan-2-yl-bis-(4-methoxy)benzoate).

In an embodiment of said process the optionally one or more internal electron donor is activated by an activator, preferably wherein the activator is a benzamide according to Formula X:

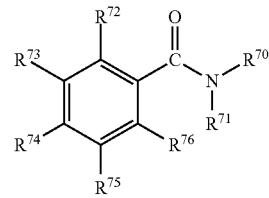

Formula X wherein:

$R^{70}$ and $R^{71}$ are each independently selected from hydrogen or an alkyl, preferably an alkyl having between 1 and 6 carbon atoms; $R^{72}$, $R^{73}$, $R^{74}$, $R^{75}$, $R^{76}$ are each independently selected from hydrogen, a heteroatom such as a halide, or a hydrocarbyl group selected e.g. from alkyl, alkenyl, aryl, aralkyl, alkoxycarbonyl or alkylaryl groups, and one or more combinations thereof, wherein preferably the activator is N,N-dimethylbenzamide.

In an embodiment, benzamide according to formula X is present in the procatalyst in an amount from 0.1 to 4 wt. % as determined using HPLC, for example from 0.1-3.5 wt. %, for example from 0.1 to 3 wt. %, for example from 0.1 to 2.5 wt. %, for example from 0.1 to 2.0 wt. %, for example from 0.1 to 1.5 wt. %.

In another aspect, the present invention relates to a catalyst system obtained or obtainable by the process of the present invention.

In another aspect, the present invention relates to a process for preparing a polyolefin by contacting at least one olefin with the catalyst system according to the invention, wherein the olefin is preferably propylene or a mixture of propylene and ethylene.

In another aspect, the present invention relates to a polyolefin obtained or obtainable by the process for preparing a polyolefin according to the present invention, preferably a polypropylene of a propylene-ethylene copolymer.

In another aspect, the present invention relates to a composition comprising a propylene-ethylene copolymer having a xylene soluble content (XS) of less than 7.5 wt. %, wherein the XS is measured according to ASTM D 5492-10 and having a haze increase over 21 days at 50° C. of less than 12, for example less than 11, wherein the haze increase over 21 days at 50° C. is the difference between the haze value of the sample before heating and the haze value after heating the sample at 50° C. for 21 days and wherein the haze value is measured on a BYK Gardner according to ASTM D 1003-00, procedure A, wherein the amount of ethylene in the propylene-ethylene copolymer is in the range from 1 to 8 wt. % based on the propylene-ethylene copolymer.

In an embodiment, the present invention relates to a composition comprising a propylene-ethylene copolymer having a xylene soluble content (XS) of less than 7.5 wt. %, wherein the XS is measured according to ASTM D 5492-10.

In an embodiment, the present invention relates to a composition having a haze increase over 21 days at 50° C. of less than 12, wherein the haze increase over 21 days at 50° C. is the difference between the haze value of the sample before heating and the haze value after heating the sample at 50° C. for 21 days and wherein the haze value is measured on a BYK Gardner according to ASTM D 1003-00, procedure A.

In an embodiment, the present invention relates to a composition having a haze increase over 21 days at 50° C. of less than 11.

In an embodiment, the present invention relates to a composition wherein the amount of ethylene in the propylene-ethylene copolymer is in the range from 1 to 8 wt. % based on the propylene-ethylene copolymer.

In another aspect, the present invention relates to a shaped article comprising the polyolefin or the composition according to the present invention.

In another aspect, the present invention relates to the use of said polyolefin.

These aspects and embodiments will be described in more detail below.

The catalyst system provided by the present invention achieves polyolefins having a reduced volatile fraction, when compared to corresponding polymers produced using reference catalyst systems. In particular, the catalyst system is capable do reduce volatiles in the polyolefins while retaining the desired mechanical properties, in particular mechanical strength.

The catalyst system provided by the present invention also achieves polyolefins exhibiting a reduced blooming, when compared to corresponding polymers produced using reference catalyst systems. In particular, blooming while controlling the xylene soluble fraction, which affects certain mechanical properties of the polymer.

Definitions

The following definitions are used in the present description and claims to define the stated subject matter. Other terms not cited below are meant to have the generally accepted meaning in the field.

"Ziegler-Natta catalyst" as used in the present description means: a transition metal-containing solid catalyst compound comprises a transition metal halide selected from titanium halide, chromium halide, hafnium halide, zirconium halide, and vanadium halide, supported on a metal or metalloid compound (e.g. a magnesium compound or a silica compound).

"Ziegler-Natta catalytic species" or "catalytic species" as used in the present description means: a transition metal-containing species comprises a transition metal halide selected from titanium halide, chromium halide, hafnium halide, zirconium halide and vanadium halide.

"internal donor" or "internal electron donor" or "ID" as used in the present description means: an electron-donating compound containing one or more atoms of oxygen (O) and/or nitrogen (N). This ID is used as a reactant in the preparation of a solid procatalyst. An internal donor is commonly described in prior art for the preparation of a solid-supported Ziegler-Natta catalyst system for olefins polymerization; i.e. by contacting a magnesium-containing support with a halogen-containing Ti compound and an internal donor.

"external donor" or "external electron donor" or "ED" as used in the present description means: an electron-donating compound used as a reactant in the polymerization of olefins. An ED is a compound added independent of the procatalyst. It is not added during procatalyst formation. It contains at least one functional group that is capable of donating at least one pair of electrons to a metal atom. The ED may influence catalyst properties, non-limiting examples thereof are affecting the stereoselectivity of the catalyst system in polymerization of olefins having 3 or more carbon atoms, hydrogen sensitivity, ethylene sensitivity, randomness of co-monomer incorporation and catalyst productivity.

"activator" as used in the present description means: an electron-donating compound containing one or more atoms of oxygen (O) and/or nitrogen (N) which is used to during the synthesis of the procatalyst prior to or simultaneous with the addition of an internal donor.

"activating compound" as used in the present description means: a compound used to activate the solid support prior to contacting it with the catalytic species.

"modifier" or "Group 13- or transition metal modifier" as used in the present description means: a metal modifier comprising a metal selected from the metals of Group 13 of the IUPAC Periodic Table of elements and transition metals. Where in the description the terms metal modifier or metal-based modifier is used, Group 13- or transition metal modifier is meant.

"procatalyst" and "catalyst component" as used in the present description have the same meaning: a component of a catalyst composition generally comprising a solid support, a transition metal-containing catalytic species and optionally one or more internal donor.

"halide" as used in the present description means: an ion selected from the group of: fluoride (F—), chloride (Cl—), bromide (Br—) or iodide (I—).

"halogen" as used in the present description means: an atom selected from the group of: fluorine (F), chlorine (Cl), bromine (Br) or iodine (I).

"Heteroatom" as used in the present description means: an atom other than carbon or hydrogen. However, as used herein—unless specified otherwise, such as below,—when "one or more hetereoatoms" is used one or more of the following is meant: F, Cl, Br, I, N, O, P, B, S or Si.

"heteroatom selected from group 13, 14, 15, 16 or 17 of the IUPAC Periodic Table of the Elements" as used in the present description means: a hetero atom selected from B, Al, Ga, In, Tl [Group 13], Si, Ge, Sn, Pb [Group 14], N, P, As, Sb, Bi [Group 15], O, S, Se, Te, Po [Group 16], F, Cl, Br, I, At [Group 17].

"hydrocarbyl" as used in the present description means: is a substituent containing hydrogen and carbon atoms, or linear, branched or cyclic saturated or unsaturated aliphatic radical, such as alkyl, alkenyl, alkadienyl and alkynyl; alicyclic radical, such as cycloalkyl, cycloalkadienyl cycloalkenyl; aromatic radical, such as monocyclic or polycyclic aromatic radical, as well as combinations thereof, such as alkaryl and aralkyl.

"substituted hydrocarbyl" as used in the present description means: is a hydrocarbyl group that is substituted with one or more non-hydrocarbyl substituent groups. A non-limiting example of a non-hydrocarbyl substituent is a heteroatom. Examples are alkoxycarbonyl (viz. carboxylate) groups. When in the present description "hydrocarbyl" is used it can also be "substituted hydrocarbyl", unless stated otherwise.

"alkyl" as used in the present description means: an alkyl group being a functional group or side-chain consisting of carbon and hydrogen atoms having only single bonds. An alkyl group may be straight or branched and may be un-substituted or substituted. It may or may not contain heteroatoms, such as oxygen (O), nitrogen (N), phosphorus (P), silicon (Si) or sulfur (S). An alkyl group also encloses arylalkyl groups wherein one or more hydrogen atoms of the alkyl group have been replaced by aryl groups, "aryl" as used in the present description means: an aryl group being a functional group or side-chain derived from an aromatic ring. An aryl group may be un-substituted or substituted with straight or branched hydrocarbyl groups. It may or may not contain heteroatoms, such as oxygen (O), nitrogen (N), phosphorus (P), silicon (Si) or sulfur (S). An aryl group also encloses alkaryl groups wherein one or more hydrogen atoms on the aromatic ring have been replaced by alkyl groups.

"alkoxide" or "alkoxy" as used in the present description means: a functional group or side-chain obtained from a alkyl alcohol. It consist of an alkyl bonded to a negatively charged oxygen atom.

"aryloxide" or "aryloxy" or "phenoxide" as used in the present description means: a functional group or side-chain obtained from an aryl alcohol. It consist of an aryl bonded to a negatively charged oxygen atom.

"Grignard reagent" or "Grignard compound" as used in the present description means: a compound or a mixture of compounds of formula $R^4_z MgX^4_{2-z}$ ($R^4$, z, and $X^4$ are as defined below) or it may be a complex having more Mg clusters, e.g. $R_4Mg_3Cl_2$.

"polymer" as used in the present description means: a chemical compound comprising repeating structural units, wherein the structural units are monomers.

"olefin" as used in the present description means: an alkene.

"olefin-based polymer" or "polyolefin" as used in the present description means: a polymer of one or more alkenes.

"propylene-based polymer" as used in the present description means: a polymer of propylene and optionally a comonomer.

"polypropylene" as used in the present description means: a polymer of propylene.

"copolymer" as used in the present description means: a polymer prepared from two or more different monomers.

"monomer" as used in the present description means: a chemical compound that can undergo polymerization.

"thermoplastic" as used in the present description means: capable of softening or fusing when heated and of hardening again when cooled.

"polymer composition" as used in the present description means: a mixture of either two or more polymers or of one or more polymers and one or more additives.

"$M_w$" and "$M_n$" in the context of the present invention means the ratio of the weight average molecular weight $M_w$ and the number average molecular weight $M_n$ of a sample, as measured according to ASTM D6474-12.

"PDI" in the context of the present invention means the ratio of the weight average molecular weight $M_w$ and the number average molecular weight $M_n$ of a sample, as measured according to ASTM D6474-12. As used herein, the terms "PDI" and "polydispersity index" are interchangeable.

"MWD" in the context of the present invention means distribution of the molecular weight of a sample, as represented by the ratio of the weight average molecular weight $M_w$ and the number average molecular weight $M_n$ of a sample as measured according to ASTM D6474-12. As used herein, the terms "MWD" and "molecular weight distribution" are interchangeable.

"XS" as used in the present description means: the xylene soluble fraction in terms of percentage of polymer that does not precipitate out upon cooling of a polymer solution in xylene, said polymer solution having been subjected to reflux conditions, down from the reflux temperature, which equals the boiling temperature of xylene, to 25° C. XS is measured according to ASTM D5492-10. As used herein, the terms "XS" and "xylene soluble fraction" are interchangeable.

"haze" as used in the present description means the scattering of light by a specimen responsible for the reduction in contrast of objects viewed through it. Haze is expressed as the percentage of transmitted light that is scattered so that its direction deviates more than a specified angle of 2.5° from the direction of the incident light beam. Haze is measured according to ASTM D1003-00, procedure A.

"haze increase" as used in the present description means the difference in haze between a measurement on a sample according to ASTM D1003-00, procedure A, as prepared and a measurement on said same sample according to ASTM D1003-00, procedure A, following exposure of said sample to a temperature of 50° C. for a period of 21 days. As used herein, the terms "haze increase" and "blooming" are interchangeable.

"impact" or "impact performance" or "impact resistance" as used in the present description is measured by Izod RT impact testing according to ISO 180/A at room temperature expressed in $kJ/m^2$ on polypropylene bars having a dimension of 65×12.7×3.2 millimeters (prepared by injection molding at a melt temperature of 240° C. and a mould temperature of 45° C.) using type A notch types.

"flexural modulus" in the context of the present invention means the modulus of elasticity according to ASTM D790-10, measured according to procedure A.

"polymerization conditions" as used in the present description means: temperature and pressure parameters within a polymerization reactor suitable for promoting polymerization between the catalyst composition and an olefin to form the desired polymer. These conditions depend on the type of polymerization used.

"production rate" or "yield" as used in the present description means: the amount of kilograms of polymer produced per gram of catalyst composition consumed in the polymerization reactor per hour, unless stated otherwise.

"MFR" as used in the present description means the melt mass-flow rate as measured according to ISO 1133:2005, at 230° C. under a load of 2.16 kg. As used herein, the terms "MFR", "melt flow rate" and "melt mass-flow rate" are interchangeable.

Unless stated otherwise, when it is stated that any R group is "independently selected from" this means that when several of the same R groups are present in a molecule they may have the same meaning of they may not have the same meaning. For example, for the compound $R_2M$, wherein R is independently selected from ethyl or methyl, both R groups may be ethyl, both R groups may be methyl or one R group may be ethyl and the other R group may be methyl.

The present invention is described below in more detail. All embodiments described with respect to one aspect of the present invention are also applicable to the other aspects of the invention, unless otherwise stated.

As stated above, the external donor DEATES according to the present invention shows a better result with respect to emission in the polyolefins produced using this donors in a catalyst system, in other words exhibit a lower emission.

Another advantage of the present invention is that the external donor according to the present invention shows a better result with respect to blooming in the polyolefins produced using this donor in a catalyst system. They more over show a better effect regarding statics.

The present invention is related to dialkylamino-alkoxysilanes, especially diethylaminetriethoxysilane as external donor. One of the functions of an external donor compound is to affect the stereoselectivity of the catalyst system in polymerization of olefins having three or more carbon atoms. Therefore it may be also referred to as a selectivity control agent. In addition to DEATES, one or more additional external donors may be used in preparing a catalyst system according to the present invention.

Mixtures of external donors may be present and may include from about 0.1 mol. % to about 99.9 mol. % of a first external donor (DEATES) and from about 99.9 mol. % to about 0.1 mol. % of either a second or the additional alkoxysilane (e.g. an alkyl trialkoxysilane or dialkylamine trialkoxysilane) external donor disclosed below. Combinations of DEATES with other donor(s) may also be used. In an embodiment, DEATES is the only external donor used.

The aluminum/external donor molar ratio in the polymerization catalyst system preferably is between 0.1 and 200; more preferably between 1 and 100. In a Ti-based catalyst, the Si/Ti molar ratio in the catalyst system can range from 0.1 to 40, preferably from 0.1 to 20, even more preferably from 1 to 20 and most preferably from 2 to 10.

Documents EP1538167 and EP1783145 disclose a Ziegler-Natta catalyst type comprising an organo-silicon compound as external donor that is represented by formula $Si(OR^c)_3(NR^dR^e)$, wherein $R^c$ is a hydrocarbon group having 1 to 6 carbon atoms, $R^d$ is a hydrocarbon group having 1 to 12 carbon atoms or hydrogen atom, and $R^e$ is a hydrocarbon group having 1 to 12 carbon atoms used as an external electron donor.

Another example of a suitable additional external donor according to the present invention is a compound according to Formula III. DEATES also complies with Formula III as discussed below:

$(R^{90})_2N\text{-A-}Si(OR^{91})_3$      Formula III

The $R^{90}$ and $R^{91}$ groups are each independently an alkyl having between 1 and 10 carbon atoms. Said alkyl group may be linear, branched or cyclic. Said alkyl group may be substituted or unsubstituted. Preferably, said hydrocarbyl group has between 1 and 8 carbon atoms, even more preferably between 1 and 6 carbon atoms, even more preferably between 2 and 4 carbon atoms. Preferably, each $R^{90}$ is ethyl. Preferably each $R^{91}$ is ethyl. A is either a direct bond between nitrogen and silicon (in other words, is not present) or a spacer selected from an alkyl having 1-10 carbon atoms. A is preferably a direct bond.

The external donor that is present in the catalyst system according to the present invention is diethyl-amino-triethoxysilane (DEATES) wherein A is a direct bond, each $R^{90}$ is ethyl and each $R^{91}$ is ethyl in Formula II.

The present invention is related to Ziegler-Natta type catalyst. A Ziegler-Natta type procatalyst generally comprising a solid support, a transition metal-containing catalytic species and optionally one or more internal donors. The present invention moreover relates to a catalyst system comprising a Ziegler-Natta type procatalyst, a co-catalyst and optionally an external electron donor. The term "Ziegler-Natta" is known in the art.

The transition metal-containing solid catalyst compound comprises a transition metal halide (e.g. titanium halide, chromium halide, hafnium halide, zirconium halide or vanadium halide) supported on a metal or metalloid compound (e.g. a magnesium compound or a silica compound).

Specific examples of several types of Ziegler-Natta catalyst as disclosed below, e.g. as disclosed in EP 1 273 595 of Borealis Technology, EP 0 019 330 of Dow, U.S. Pat. No. 5,093,415 of Dow, U.S. Pat. No. 6,825,146 of Dow.

As comparative examples are used procatalyst according to the following prior art documents.

U.S. Pat. No. 4,771,024 (see Procatalyst IV in Examples of the present description) discloses the preparation of a catalyst on column 10, line 61 to column 11, line 9. The section "catalyst manufacture on silica" is incorporated into the present application by reference. The process comprises combining dried silica with carbonated magnesium solution (magnesium diethoxide in ethanol was bubbled with $CO_2$). The solvent was evaporated at 85° C. The resulting solid was washed and a 50:50 mixture of titanium tetrachloride and chlorobenzene was added to the solvent together with ethylbenzoate. The mixture was heated to 100° C. and liquid filtered. Again $TiCl_4$ and chlorobenzene were added, followed by heating and filtration. A final addition of $TiCl_4$ and chlorobenzene and benzoylchloride was carried out, followed by heating and filtration. After washing the catalyst was obtained.

WO03/068828 (see Procatalyst III in Examples of the present description) discloses a process for preparing a catalyst component on page 91 "preparation of solid catalyst components" which section is incorporated into the present application by reference. Magnesium chloride, toluene, epoxy chloropropane and tributyl phosphate were added under nitrogen to a reactor, followed by heating. Then phthalic anhydride was added. The solution was cooled to −25° C. and $TiCl_4$ was added drop wise, followed by heating. An internal donor was added (1,3-diphenyl-1,3-propylene glycol dibenzoate, 2-methyl-1,3-diphenyl-1,3-propylene glycol dibenzoate, 1,3-diphenyl-1,3-propyleneglycol diproprionate, or 1,3-diphenyl-2-methyl-1,3-propylene glycol diproprionate) and after stirring a solid was obtained and washed. The solid was treated with $TiCl_4$ in toluene twice, followed by washing to obtain a catalyst component.

U.S. Pat. No. 4,866,022 (see Procatalyst II in Examples of the present description) discloses a catalyst component comprises a product formed by: A. forming a solution of a magnesium-containing species from a magnesium carbonate or a magnesium carboxylate; B. precipitating solid particles from such magnesium-containing solution by treatment with a transition metal halide and an organosilane having a formula: $R_nSiR'_{4-n}$, wherein n=0 to 4 and wherein R is hydrogen or an alkyl, a haloalkyl or aryl radical containing one to about ten carbon atoms or a halosilyl radical or haloalkylsilyl radical containing one to about eight carbon atoms, and R' is OR or a halogen: C. reprecipitating such solid particles from a mixture containing a cyclic ether; and D. treating the reprecipitated particles with a transition metal compound and an electron donor. This process for preparing a catalyst is incorporated into the present application by reference.

The present invention is related to a so-called TiNo catalyst. It is a magnesium-based supported titanium halide catalyst optionally comprising one or more internal donors. During the process of producing polyolefins using TiNo as a procatalyst, under certain conditions, static electricity may occur in the reactor, leading to undesirable static effects, such as a more problematic process due to sticking of a powdery product to either the stirrer and/or the wall of the reactor (also known as fouling and/or sheeting of the reactor). It has surprisingly been found by the present inventors that the use of the N-containing DEATES electron donor according to the present invention shows a reduction in statics during the polymerisation reaction.

"statics" as used in the present description means: static electricity effects that may occur during the polymerization process in the reactor, causing catalyst particles to stick to reactor parts such as the reactor walls and stirring equipment.

The Ziegler-Natta type procatalyst in the catalyst system according to the present invention is obtained by the process as described in WO 2007/134851 A1. In Example I the process is disclosed in more detail. Example I including all sub-examples (IA-IE) of WO 2007/134851 is incorporated into the present description. More details about the different embodiments are disclosed starting on page 3, line 29 to page 14 line 29 of WO 2007/134851. These embodiments are incorporated by reference into the present description. This process produces a so-called TiNo procatalyst (see Procatalyst I in the Examples of the present description).

In the following part of the description the different steps and phases of the process for preparing the procatalyst according to the present invention will be discussed.

The process for preparing a procatalyst according to the present invention comprises the following phases:

Phase A): preparing a solid support for the procatalyst;

Phase B): optionally activating said solid support obtained in phase A) using one or more activating compounds to obtain an activated solid support;

Phase C): contacting said solid support obtained in phase A) or said activated solid support in phase B) with a catalytic species wherein phase C) comprises one of the following:

contacting said solid support obtained in phase A) or said activated solid support in phase B) with a catalytic species to obtain said procatalyst; or contacting said solid support obtained in phase A) or said activated solid support in phase B) with a catalytic species and one or more internal donors to obtain said procatalyst; or contacting said solid support obtained in phase A) or said activated solid support in phase B) with a catalytic species and one or more internal donors to obtain an intermediate product; or iv) contacting said solid support obtained in phase A) or said activated solid support in phase B) with a catalytic species and an activator to obtain an intermediate product;

optionally Phase D: modifying said intermediate product obtained in phase C) wherein phase D) comprises on of the following:

modifying said intermediate product obtained in phase C) with a Group 13- or transition metal modifier in case an internal donor was used during phase C), in order to obtain a procatalyst;

modifying said intermediate product obtained in phase C) with a Group 13- or transition metal modifier and one or more internal donors in case an activator was used during phase C), in order to obtain a procatalyst.

The procatalyst thus prepared can be used in polymerization of olefins using an external donor (DEATES) and a co-catalyst.

The various steps used to prepare the catalyst according to the present invention are described in more detail below.

Phase A: Preparing a Solid Support for the Catalyst

In the process of the present invention preferably a magnesium-containing support is used. Said magnesium-containing support is known in the art as a typical component of a Ziegler-Natta procatalyst. The following description explains the process of preparing magnesium-based support. Other supports may be used.

Synthesis of magnesium-containing supports, such as magnesium halides, magnesium alkyls and magnesium aryls, and also magnesium alkoxy and magnesium aryloxy compounds for polyolefin production, particularly of poly-propylenes production are described for instance in U.S. Pat. No. 4,978,648, WO96/32427A1, WO01/23441 A1, EP1283 222A1, EP1222 214B1; U.S. Pat. No. 5,077,357; U.S. Pat. No. 5,556,820; U.S. Pat. No. 4,414,132; U.S. Pat. No. 5,106,806 and U.S. Pat. No. 5,077,357 but the present process is not limited to the disclosure in these documents.

Preferably, the process for preparing the solid support for the procatalyst according to the present invention comprises the following steps: step o) which is optional and step i).

Step o) Preparation of the Grignard Reagent (Optional)

A Grignard reagent, $R^4zMgX^4_{2-z}$ used in step i) may be prepared by contacting metallic magnesium with an organic halide $R^4X^4$, as described in WO 96/32427 A1 and WO01/23441 A1. All forms of metallic magnesium may be used, but preferably use is made of finely divided metallic magnesium, for example magnesium powder. To obtain a fast reaction it is preferable to heat the magnesium under nitrogen prior to use.

$R^4$ is a hydrocarbyl group independently selected from alkyl, alkenyl, aryl, aralkyl, alkylaryl, or alkoxycarbonyl groups, wherein said hydrocarbyl group may be linear, branched or cyclic, and may be substituted or unsubstituted; said hydrocarbyl group preferably having between 1 and 20 carbon atoms or combinations thereof. The $R^4$ group may contain one or more heteroatoms.

$X^4$ is selected from the group of consisting of fluoride (F—), chloride (Cl—), bromide (Br—) or iodide (I—).

The value for z is in a range of larger than 0 and smaller than 2: $0<z<2$. Combinations of two or more organic halides $R^4X^4$ can also be used.

The magnesium and the organic halide $R^4X^4$ can be reacted with each other without the use of a separate dispersant; the organic halide $R^4X^4$ is then used in excess.

The organic halide $R^4X^4$ and the magnesium can also be brought into contact with one another and an inert dispersant. Examples of these dispersants are: aliphatic, alicyclic or aromatic dispersants containing from 4 up to 20 carbon atoms.

Preferably, in this step o) of preparing $R^4_zMgX^4_{2-z}$, also an ether is added to the reaction mixture. Examples of ethers are: diethyl ether, diisopropyl ether, dibutyl ether, diisobutyl ether, diisoamyl ether, diallyl ether, tetrahydrofuran and anisole. Dibutyl ether and/or diisoamyl ether are preferably used. Preferably, an excess of chlorobenzene is used as the organic halide $R^4X^4$. Thus, the chlorobenzene serves as dispersant as well as organic halide $R^4X^4$.

The organic halide/ether ratio acts upon the activity of the procatalyst. The chlorobenzene/dibutyl ether volume ratio may for example vary between 75:25 and 35:65, preferably between 70:30 and 50:50.

Small amounts of iodine and/or alkyl halides can be added to cause the reaction between the metallic magnesium and the organic halide $R^4X^4$ to proceed at a higher rate. Examples of alkyl halides are butyl chloride, butyl bromide and 1,2-dibromoethane. When the organic halide $R^4X^4$ is an alkyl halide, iodine and 1,2-dibromoethane are preferably used.

The reaction temperature for step o) of preparing $R^4_zMgX^4_{2-z}$ normally is between 20 and 150° C.; the reaction time is normally between 0.5 and 20 hours. After the reaction for preparing $R^4_zMgX^4_{2-z}$ is completed, the dissolved reaction product may be separated from the solid residual products. The reaction may be mixed. The stirring speed can be determined by a person skilled in the art and should be sufficient to agitate the reactants.

Step i) Reacting a Grignard Compound with a Silane Compound

Step i): contacting a compound $R^4_zMgX^4_{2-z}$— wherein $R_4$, $X^4$, and z are as discussed above—with an alkoxy- or aryloxy-containing silane compound to give a first intermediate reaction product. Said first intermediate reaction product is a solid magnesium-containing support. It should be noted that with "alkoxy- or aryloxy-containing" is meant $OR^1$ containing. In other words said alkoxy- or aryloxy-containing silane compound comprises at least one $OR^1$ group. $R^1$ is selected from the group consisting of a linear, branched or cyclic hydrocarbyl group independently selected e.g. from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms.

In step i) a first intermediate reaction product is thus prepared by contacting the following reactants: * a Grignard reagent—being a compound or a mixture of compounds of formula $R^4_z MgX^4_{2-z}$ and * an alkoxy- or aryloxy-containing silane compound. Examples of these reactants are disclosed for example in WO 96/32427 A1 and WO01/23441 A1.

The compound $R^4_z MgX^4_{2-z}$ used as starting product is also referred to as a Grignard compound. In $R^4_z MgX^4_{2-z}$, $X^4$ is preferably chloride or bromide, more preferably chloride.

$R^4$ can be an alkyl, aryl, aralkyl, alkoxide, phenoxide, etc., or mixtures thereof. Suitable examples of group $R^4$ are methyl, ethyl, n-propyl, i-propyl, n-butyl, i-butyl, t-butyl, hexyl, cyclohexyl, octyl, phenyl, tolyl, xylyl, mesityl, benzyl, phenyl, naphthyl, thienyl, indolyl. In a preferred embodiment of the invention, $R^4$ represents an aromatic group, for instance a phenyl group.

Preferably, as Grignard compound $R^4_z MgX^4_{2-z}$ used in step i) a phenyl Grignard or a butyl Grignard is used. The selection for either the phenyl Grignard or the butyl Grignard depends on the requirements.

When a Grignard compound is used, a compound according to the formula $R^4_z MgX^4_{2-z}$ is meant. When phenyl Grignard is used a compound according to the formula $R^4_z MgX^4_{2-z}$ wherein $R^4$ is phenyl, e.g. PhMgCl, is meant. When butyl Grignard is used, a compound according to the formula $R^4_z MgX^4_{2-z}$ wherein $R^4$ is butyl, e.g. BuMgCl or n-BuMgCl, is meant.

An advantage of the use of phenyl Grignard are that it is more active that butyl Grignard. Preferably, when butyl Grignard is used, an activation step using an aliphatic alcohol, such as methanol is carried out in order to increase the activity. Such an activation step may not be required with the use of phenyl Grignard. A disadvantage of the use of phenyl Grignard is that benzene rest products may be present and that it is more expensive and hence commercially less interesting.

An advantage of the use of butyl Grignard is that it is benzene free and is commercially more interesting due to the lower price. A disadvantage of the use of butyl Grignard is that in order to have a high activity, an activation step is required.

The process to prepare the procatalyst for use in an embodiment of the present invention can be carried out using any Grignard compound, but the two stated above are the two that are most preferred.

In the Grignard compound of formula $R^4_z MgX^4_{2-z}$ z is preferably from about 0.5 to 1.5.

The compound $R^4_z MgX^4_{2-z}$ may be prepared in an optional step (step o) which is discussed above), preceding step i) or may be obtained from a different process.

It is explicitly noted that it is possible that the Grignard compound used in step i) may alternatively have a different structure, for example, may be a complex. Such complexes are already known to the skilled person in the art; a particular example of such complexes is $Phenyl_4 Mg_3 Cl_2$.

The alkoxy- or aryloxy-containing silane used in step i) is preferably a compound or a mixture of compounds with the general formula $Si(OR^5)_{4-n} R^6_n$, Wherein it should be noted that the $R^5$ group is the same as the $R^1$ group. The $R^1$ group originates from the $R^5$ group during the synthesis of the first intermediate reaction product.

$R^5$ is a hydrocarbyl group independently selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms, more preferably between 1-12 carbon atoms, even more preferably between 1 and 6 carbon atoms. Preferably, said hydrocarbyl group is an alkyl group, preferably having between 1 and 20 carbon atoms, more preferably between 1-12 carbon atoms, even more preferably between 1 and 6 carbon atoms, such as for example methyl, ethyl, n-propyl, isopropyl, n-butyl, sec-butyl, iso-butyl, t-butyl, pentyl or hexyl; most preferably, selected from ethyl and methyl.

$R^6$ is a hydrocarbyl group independently selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms, more preferably between 1-12 carbon atoms, even more preferably between 1 and 6 carbon atoms. Preferably, said hydrocarbyl group is an alkyl group, preferably having between 1 and 20 carbon atoms, more preferably between 1-12 carbon atoms, even more preferably between 1 and 6 carbon atoms, such as for example methyl, ethyl, n-propyl, isopropyl, n-butyl, sec-butyl, iso-butyl, t-butyl, or cyclopentyl.

The value for n is in the range of 0 up to 4, preferably n is from 0 up to and including 1.

Examples of suitable silane-compounds include tetramethoxysilane, tetraethoxysilane, methyltrimethoxysilane, methyltributoxysilane, phenyltriethoxy-silane, diethyldiphenoxysilane, n-propyltriethoxysilane, diisopropyldimethoxysilane, diisobutyldimethoxysilane, n-propyltrimethoxysilane, cyclohexyl-methyldimethoxysilane, dicyclopentyldimethoxy-silane, isobutylisopropyldimethoxyl-silane, phenyl-trimethoxysilane, diphenyl-dimethoxysilane, trifluoropropylmethyl-dimethoxysilane, bis(perhydroisoquinolino)-dimethoxysilane, dicyclohexyldimethoxysilane, dinorbornyl-dimethoxysilane, di(n-propyl)dimethoxysilane, di(iso-propyl)-dimethoxysilane, di(n-butyl)dimethoxysilane and/or di(iso-butyl)dimethoxysilane.

Preferably, tetraethoxy-silane is used as silane-compound in preparing the solid Mg-containing compound during step i) in the process according to the present invention.

Preferably, in step i) the silane-compound and the Grignard compound are introduced simultaneously to a mixing device to result in particles of the first intermediate reaction product having advantageous morphology. This is for example described in WO 01/23441 A1. Here, 'morphology' does not only refer to the shape of the particles of the solid Mg-compound and the catalyst made therefrom, but also to the particle size distribution (also characterized as span, viz. an indicator for the width of the particle size distribution as measured according to ISO 13320:2009), its fines content, powder flowability, and the bulk density (viz. the weight per unit volume of a material, including voids inherent in the material as tested; measured as apparent density according to ASTM D1895-96 Reapproved 2010-e1, test method A) of the catalyst particles. Moreover, it is well known that a polyolefin powder produced in polymerization process using a catalyst system based on such procatalyst has a similar morphology as the procatalyst (the so-called "replica effect"; see for instance S. van der Ven, Polypropylene and other Polyolefins, Elsevier 1990, p. 8-10). Accordingly, almost round polymer particles are obtained with a length/diameter ratio (l/D) smaller than 2 and with good powder flowability.

As discussed above, the reactants are preferably introduced simultaneously. With "introduced simultaneously" is meant that the introduction of the Grignard compound and the silane-compound is done in such way that the molar ratio Mg/Si does not substantially vary during the introduction of these compounds to the mixing device, as described in WO 01/23441 A1.

The silane-compound and Grignard compound can be continuously or batch-wise introduced to the mixing device. Preferably, both compounds are introduced continuously to a mixing device.

The mixing device can have various forms; it can be a mixing device in which the silane-compound is premixed with the Grignard compound, the mixing device can also be a stirred reactor, in which the reaction between the compounds takes place. The separate components may be dosed to the mixing device by means of peristaltic pumps.

Preferably, the compounds are premixed before the mixture is introduced to the reactor for step i). In this way, a procatalyst is formed with a morphology that leads to polymer particles with the best morphology (high bulk density, narrow particle size distribution, (virtually) no fines, excellent flowability).

The Si/Mg molar ratio during step i) may range from 0.2 to 20. Preferably, the Si/Mg molar ratio is from 0.4 to 1.0.

The period of premixing of the reactants in above indicated reaction step may vary between wide limits, for instance 0.1 to 300 seconds. Preferably premixing is performed during 1 to 50 seconds.

The temperature during the premixing step of the reactants is not specifically critical, and may for instance range between 0 and 80° C.; preferably the temperature is between 10° C. and 50° C.

The reaction between said reactants may, for instance, take place at a temperature between −20° C. and 100° C.; for example at a temperature of from 0° C. to 80° C. The reaction time is for example between 1 and 5 hours.

The mixing speed during the reaction depends on the type of reactor used and the scale of the reactor used. The mixing speed can be determined by a person skilled in the art. As a non-limiting example, mixing may be carried out at a mixing speed of between 250-300 rpm. In an embodiment, when a blade stirrer is used the mixing speed is between 220 and 280 rpm and when a propeller stirrer is used the mixing speed is between 270 and 330 rpm. The stirrer speed may be increased during the reaction. For example, during the dosing, the speed of stirring may be increased every hour by 20-30 rpm.

The first intermediate reaction product obtained from the reaction between the silane compound and the Grignard compound is usually purified by decanting or filtration followed by rinsing with an inert solvent, for instance a hydrocarbon solvent with for example 1-20 carbon atoms, like pentane, iso-pentane, hexane or heptane. The solid product can be stored and further used as a suspension in said inert solvent. Alternatively, the product may be dried, preferably partly dried, and preferably under mild conditions; e.g. at ambient temperature and pressure.

The first intermediate reaction product obtained by this step i) may comprise a compound of the formula $Mg(OR^1)_x X^1_{2-x}$, wherein:

$R^1$ is a hydrocarbyl group independently selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms, more preferably between 1-12 carbon atoms, even more preferably between 1 and 6 carbon atoms. Preferably, said hydrocarbyl group is an alkyl group, preferably having between 1 and 20 carbon atoms, more preferably between 1-12 carbon atoms, even more preferably between 1 and 6 carbon atoms. Most preferably selected from ethyl and methyl.

$X^1$ is selected from the group of consisting of fluoride (F—), chloride (Cl—), bromide (Br—) or iodide (I—). Preferably, $X^1$ is chloride or bromine and more preferably, $X^1$ is chloride.

The value for x is in the range of larger than 0 and smaller than 2: $0<z<2$. The value for x is preferably between 0.5 and 1.5.

Phase B: Activating Said Solid Support for the Catalyst

This step of activating said solid support for the procatalyst is an optional step that is not required, but is preferred, in the present invention. If this step of activation is carried out, preferably, the process for activating said solid support comprises the following step ii). This phase may comprise one or more stages.

Step ii) Activation of the Solid Magnesium Compound

Step ii): contacting the solid $Mg(OR^1)_x X^1_{2-x}$ with at least one activating compound selected from the group formed by activating electron donors and metal alkoxide compounds of formula $M^1(OR^2)_{v-w}(OR^3)_w$ or $M^2(OR^2)_{v-w}(R^3)_w$, wherein:

$R^2$ is a hydrocarbyl group independently selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms, more preferably between 1-12 carbon atoms, even more preferably between 1 and 6 carbon atoms. Preferably, said hydrocarbyl group is an alkyl group, preferably having between 1 and 20 carbon atoms, more preferably between 1-12 carbon atoms, even more preferably between 1 and 6 carbon atoms, such as for example methyl, ethyl, n-propyl, isopropyl, n-butyl, sec-butyl, iso-butyl, t-butyl, pentyl or hexyl; most preferably selected from ethyl and methyl.

$R^3$ is a hydrocarbyl group independently selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms, more preferably between 1-12 carbon atoms, even more preferably between 1 and 6 carbon atoms. Preferably, said hydrocarbyl group is an alkyl group, preferably having between 1 and 20 carbon atoms, more preferably between 1-12 carbon atoms, even more preferably between 1 and 6 carbon atoms; most preferably selected from methyl, ethyl, n-propyl, isopropyl, n-butyl, sec-butyl, iso-butyl, t-butyl, and cyclopentyl.

$M^1$ is a metal selected from the group consisting of Ti, Zr, Hf, Al or Si; v is the valency of $M^1$; $M^2$ is a metal being Si; v is the valency of $M^2$ and w is smaller than v.

The electron donors and the compounds of formula $M(OR^2)_{v-w}(OR^3)_w$ and $M(OR^2)_{v-w}(R^3)_w$ may be also referred herein as activating compounds.

In this step either one or both types of activating compounds (viz. activating electron donor or metal alkoxides) may be used.

The advantage of the use of this activation step prior to contacting the solid support with the halogen-containing titanium compound (process phase C) is that a higher yield of polyolefins is obtained per gram of the procatalyst. Moreover, the ethylene sensitivity of the catalyst system in the copolymerization of propylene and ethylene is also increased because of this activation step. This activation step is disclosed in detail in WO2007/134851 of the present applicant.

Examples of suitable activating electron donors that may be used in step ii) are known to the skilled person and described herein below, i.e. include carboxylic acids, carboxylic acid anhydrides, carboxylic acid esters, carboxylic acid halides, alcohols, ethers, ketones, amines, amides, nitriles, aldehydes, alkoxides, sulfonamides, thioethers, thioesters and other organic compounds containing one or more hetero atoms, such as nitrogen, oxygen, sulfur and/or phosphorus.

Preferably, an alcohol is used as the activating electron donor in step ii). More preferably, the alcohol is a linear or branched aliphatic or aromatic alcohol having 1-12 carbon atoms. Even more preferably, the alcohol is selected from methanol, ethanol, butanol, isobutanol, hexanol, xylenol and benzyl alcohol. Most preferably, the alcohol is ethanol or methanol, preferably ethanol.

Suitable carboxylic acids as activating electron donor may be aliphatic or (partly) aromatic. Examples include formic acid, acetic acid, propionic acid, butyric acid, isobutanoic acid, acrylic acid, methacrylic acid, maleic acid, fumaric acid, tartaric acid, cyclohexanoic monocarboxylic acid, cis-1,2-cyclohexanoic dicarboxylic acid, phenylcarboxylic acid, toluenecarboxylic acid, naphthalene carboxylic acid, phthalic acid, isophthalic acid, terephthalic acid and/or trimellitic acid.

Anhydrides of the aforementioned carboxylic acids can be mentioned as examples of carboxylic acid anhydrides, such as for example acetic acid anhydride, butyric acid anhydride and methacrylic acid anhydride.

Suitable examples of esters of above-mentioned carboxylic acids are formates, for instance, butyl formate; acetates, for instance ethyl acetate and butyl acetate; acrylates, for instance ethyl acrylate, methyl methacrylate and isobutyl methacrylate; benzoates, for instance methylbenzoate and ethylbenzoate; methyl-p-toluate; ethyl-naphthate and phthalates, for instance monomethyl phthalate, dibutyl phthalate, diisobutyl phthalate, diallyl phthalate and/or diphenyl phthalate.

Examples of suitable carboxylic acid halides as activating electron donors are the halides of the carboxylic acids mentioned above, for instance acetyl chloride, acetyl bromide, propionyl chloride, butanoyl chloride, butanoyl iodide, benzoyl bromide, p-toluyl chloride and/or phthaloyl dichloride.

Suitable alcohols are linear or branched aliphatic alcohols with 1-12 C-atoms, or aromatic alcohols. Examples include methanol, ethanol, butanol, isobutanol, hexanol, xylenol and benzyl alcohol. The alcohols may be used alone or in combination. Preferably, the alcohol is ethanol or hexanol.

Examples of suitable ethers are diethers, such as 2-ethyl-2-butyl-1,3-dimethoxypropane, 2-isopropyl-2-isopentyl-1,3-dimethoxypropane and/or 9,9-bis(methoxymethyl) fluorene. Also, cyclic ethers like tetrahydrofuran (THF), or tri-ethers can be used.

Suitable examples of other organic compounds containing a heteroatom for use as activating electron donor include 2,2,6,6-tetramethyl piperidine, 2,6-dimethylpiperidine, pyridine, 2-methylpyridine, 4-methylpyridine, imidazole, benzonitrile, aniline, diethylamine, dibutylamine, dimethylacetamide, thiophenol, 2-methyl thiophene, isopropyl mercaptan, diethylthioether, diphenylthioether, tetrahydrofuran, dioxane, dimethylether, diethylether, anisole, acetone, triphenylphosphine, triphenylphosphite, diethylphosphate and/or diphenylphosphate.

Examples of suitable metal alkoxides for use in step ii) are metal alkoxides of formulas: $M^1(OR^2)_{v-w}(OR^3)_w$ and $M^2(OR^2)_{v-w}(R^3)_w$ wherein $M^1$, $M^2$, $R^2$, $R^3$, v, and w are as defined herein. $R^2$ and $R^3$ can also be aromatic hydrocarbon groups, optionally substituted with e.g. alkyl groups and can contain for example from 6 to 20 carbon atoms. The $R^2$ and $R^3$ preferably comprise 1-12 or 1-8 carbon atoms. In preferred embodiments $R^2$ and $R^3$ are ethyl, propyl or butyl; more preferably all groups are ethyl groups.

Preferably, $M^1$ in said activating compound is Ti or Si. Si-containing compounds suitable as activating compounds are the same as listed above for step i).

The value of w is preferably 0, the activating compound being for example a titanium tetraalkoxide containing 4-32 carbon atoms in total from four alkoxy groups. The four alkoxide groups in the compound may be the same or may differ independently. Preferably, at least one of the alkoxy groups in the compound is an ethoxy group. More preferably the compound is a tetraalkoxide, such as titanium tetraethoxide.

In the preferred process to prepare the procatalyst, one activating compound can be used, but also a mixture of two or more compounds may be used.

A combination of a compound of $M^1(OR^2)_{v-w}(OR^3)_w$ or $M^2(OR^2)_{v-w}(R^3)_w$ with an electron donor is preferred as activating compound to obtain a catalyst system that for example shows high activity, and of which the ethylene sensitivity can be affected by selecting the internal donor; which is specifically advantageous in preparing copolymers of for example propylene and ethylene.

Preferably, a Ti-based compound, for example titanium tetraethoxide, is used together with an alcohol, like ethanol or hexanol, or with an ester compound, like ethylacetate (EA), ethylbenzoate (EB) or a phthalate ester, or together with an ether, like dibutylether (DBE), or with pyridine.

If two or more activating compounds are used in step ii) their order of addition is not critical, but may affect catalyst performance depending on the compounds used. A skilled person may optimize their order of addition based on some experiments. The compounds of step ii) can be added together or sequentially.

Preferably, an electron donor compound is first added to the compound with formula $Mg(OR^1)_xX^1_{2-x}$ where after a compound of formula $M^1(OR^2)_{v-w}(OR^3)_w$ or $M^2(OR^2)_{v-w}(R^3)_w$ as defined herein is added. The activating compounds preferably are added slowly, for instance during a period of 0.1-6, preferably during 0.5-4 hours, most preferably during 1-2.5 hours, each.

The first intermediate reaction product that is obtained in step i) can be contacted—when more than one activating compound is used—in any sequence with the activating compounds. In one embodiment, an activating electron donor is first added to the first intermediate reaction product and then the compound $M^1(OR^2)_{v-w}(OR^3)_w$ or $M^2(OR^2)_{v-w}(R^3)_w$ is added; in this order no agglomeration of solid particles is observed. The compounds in step ii) are preferably added slowly, for instance during a period of 0.1-6, preferably during 0.5-4 hours, most preferably during 1-2.5 hours, each.

The molar ratio of the activating compound to $Mg(OR^1)_x X^1_{2-x}$ may range between wide limits and is, for instance, between 0.02 and 1.0. Preferably the molar ratio is between 0.05 and 0.5, more preferably between 0.06 and 0.4, or even between 0.07 and 0.2.

The temperature in step ii) can be in the range from −20° C. to 70° C., preferably from −10° C. to 50° C., more preferably in the range from −5° C. to 40° C., and most preferably in the range between 0° C. and 30° C.

Preferably, at least one of the reaction components is dosed in time, for instance during 0.1 to 6, preferably during 0.5 to 4 hours, more particularly during 1 to 2.5 hours.

The reaction time after the activating compounds have been added is preferably between 0 and 3 hours.

The mixing speed during the reaction depends on the type and the scale of the reactor used. The mixing speed can be determined by a person skilled in the art and should be sufficient to agitate the reactants.

The inert dispersant used in step ii) is preferably a hydrocarbon solvent. The dispersant may be for example an aliphatic or aromatic hydrocarbon with 1-20 carbon atoms. Preferably, the dispersant is an aliphatic hydrocarbon, more preferably pentane, iso-pentane, hexane or heptane, heptane being most preferred.

Starting from a solid Mg-containing product of controlled morphology obtained in step i), said morphology is not negatively affected during treatment with the activating compound during step ii). The solid second intermediate reaction product obtained in step ii) is considered to be an adduct of the Mg-containing compound and the at least one activating compound as defined in step ii), and is still of controlled morphology.

The obtained second intermediate reaction product after step ii) may be a solid and may be further washed, preferably with the solvent also used as inert dispersant; and then stored and further used as a suspension in said inert solvent. Alternatively, the product may be dried, preferably partly dried, preferably slowly and under mild conditions; e.g. at ambient temperature and pressure.

Phase C: Contacting Said Solid Support with the Catalytic Species and Optionally One or More Internal Donors and/or an Activator.

Phase C: contacting the solid support with a catalytic species. This step can take different forms, such as i) contacting said solid support with a catalytic species to obtain said procatalyst; ii) contacting said solid support with the catalytic species and one or more internal donors to obtain said procatalyst; iii) contacting said solid support with a catalytic species and one or more internal donors to obtain an intermediate product; iv) contacting said solid support with a catalytic species and an activator donor to obtain an intermediate product.

The contacting of the solid support with the catalytic species may comprise several stages (e.g. I, II and/or III). During each of these consecutive stages the solid support is contacted with said catalytic species. In other words, the addition or reaction of said catalytic species may be repeated one or more times. The same or different catalytic species may be used during these stages.

These stages may be divided over Phase C (e.g. step iii) and Phase D (e.g. step v) or step v-a) and v-b). It is possible that Phase C comprises one or more stages and that Phase D comprises also one or more stages.

For example, during stage I in phase C (step iii) the solid support (first intermediate) or the activated solid support (second intermediate) is first contacted with said catalytic species and optionally subsequently with one or more internal donors and optionally an activator. When a second stage is present, during stage II (either Phase C or Phase D) the intermediate product obtained from stage I will be contacted with additional catalytic species which may the same or different than the catalytic species added during the first stage and optionally one or more internal donors and optionally an activator.

In case three stages are present, in an embodiment, stage III is v) of Phase D which is preferably a repetition of stage I or may comprise the contacting of the product obtained from phase II with both a catalytic species (which may be the same or different as above) and one or more internal donors. In other words, an internal donor may be added during each of these stages or during two or more of these stages. When an internal donor is added during more than one stage it may be the same or a different internal donor. In an embodiment stage I is step iii) of Phase C, stage II is step v-a) of Phase D, and stage III is step v-b) of Phase D.

An activator according to the present invention—if used—may be added either during stage I or stage II or stage III. An activator may also be added during more than one stage.

Preferably, the process of contacting the solid support with the catalytic species and an internal donor comprises the following step iii).

Step iii) Reacting the Solid Support with a Transition Metal Halide

Step iii) reacting the solid support with a transition metal halide (e.g. halide of titanium, chromium, hafnium, zirconium or vanadium) but preferably titanium halide. In the discussion below only the process for a titanium-base Ziegler-Natta procatalyst is disclosed, however, the present invention is also applicable to other types of Ziegler-Natta procatalysts.

Step iii): contacting the first or second intermediate reaction product, obtained respectively in step i) or ii), with a halogen-containing Ti-compound and optionally an internal electron donor or activator to obtain a third intermediate product.

Step iii) can be carried out after step i) on the first intermediate product or after step ii) on the second intermediate product.

The molar ratio in step iii) of the transition metal to the magnesium preferably is between 10 and 100, most preferably, between 10 and 50.

Preferably, an internal electron donor is also present during step iii). Also mixtures of internal electron donors can be used. Examples of internal electron donors are disclosed below.

The molar ratio of the internal electron donor relative to the magnesium may vary between wide limits, for instance between 0.02 and 0.75. Preferably, this molar ratio is between 0.05 and 0.4; more preferably between 0.1 and 0.4; and most preferably between 0.1 and 0.3.

During contacting the first or second intermediate product and the halogen-containing titanium compound, an inert dispersant is preferably used. The dispersant preferably is chosen such that virtually all side products formed are dissolved in the dispersant. Suitable dispersants include for example aliphatic and aromatic hydrocarbons and halogenated aromatic solvents with for instance 4-20 carbon atoms. Examples include toluene, xylene, benzene, heptane, o-chlorotoluene and chlorobenzene.

The reaction temperature during step iii) is preferably between 0° C. and 150° C., more preferably between 50° C. and 150° C., and more preferably between 100° C. and 140° C. Most preferably, the reaction temperature is between 110° C. and 125° C.

The reaction time during step iii) is preferably between 10 minutes and 10 hours. In case several stages are present, each stage can have a reaction time between 10 minutes and 10 hours. The reaction time can be determined by a person skilled in the art based on the type and scale of the reactor and the catalyst systems.

The mixing speed during the reaction depends on the type and the scale of the reactor used. The mixing speed can be determined by a person skilled in the art and should be sufficient to agitate the reactants.

The obtained reaction product may be washed, usually with an inert aliphatic or aromatic hydrocarbon or halogenated aromatic compound, to obtain the procatalyst of the invention. If desired the reaction and subsequent purification steps may be repeated one or more times. A final washing is preferably performed with an aliphatic hydrocarbon to result in a suspended or at least partly dried procatalyst, as described above for the other steps.

Optionally an activator is present during step iii) of Phase C instead of an internal donor, this is explained in more detail below in the section of activators.

The molar ratio of the activator relative to the magnesium may vary between wide limits, for instance between 0.02 and 0.5. Preferably, this molar ratio is between 0.05 and 0.4; more preferably between 0.1 and 0.3; and most preferably between 0.1 and 0.2.

Phase D: Modifying Said Procatalyst with a Metal-Based Modifier.

This phase D is optional in the present invention. In a preferred process for modifying the supported procatalyst, this phase comprises the following step:

Step iv) modifying the third intermediate product with a metal-modifier to yield a modified intermediate product After step iv)—if this is carried out—an additional step of contacting the intermediate product with a catalytic species (in other words, an additional stage):

Step v) contacting said modified intermediate product with a titanium halide and optionally on or more internal donors and/or activators to obtain the present procatalyst. In case no activator is used during Phase C, an activator is used during step v) of Phase D.

The order of addition, viz. the order of first step iv) and subsequently step v) is considered to be very important to the formation of the correct clusters of Group 13- or transition metal and titanium forming the modified and more active catalytic center.

Each of these steps is disclosed in more detail below.

It should be noted that the steps iii), iv) and v) (viz. phases C and D) are preferably carried out in the same reactor, viz. in the same reaction mixture, directly following each other.

Preferably step iv) is carried out directly after step iii) in the same reactor. Preferably, step v) is carried out directly after step iv) in the same reactor.

Step iv): Group 13- or Transition Metal Modification

The modification with Group 13- or transition metal, preferably aluminum, ensures the presence of Group 13- or transition metal in the procatalyst, in addition to magnesium (from the solid support) and titanium (from the titanation treatment).

Without wishing to be bound by any particular theory, the present inventors believe that one possible explanation is that the presence of Group 13- or transition metal increases the reactivity of the active site and hence increases the yield of polymer.

Step iv) comprises modifying the third intermediate product obtained in step iii) with a modifier having the formula $M(p)X_p$, preferably $MX_3$, wherein M is a metal selected from the Group 13 metals and transition metals of the IUPAC periodic table of elements, p is the oxidation state of M and wherein X is a halide to yield a modified intermediate product. In case the oxidation state of M, e.g. aluminum, is three, $M(p)$ is Al(III) and there are three monovalent halides X, e.g. $AlCl_3$ or $AlF_3$. In case the oxidation state of M, e.g. copper, is two, $M(p)$ is Cu(II) and there are two monovalent halides X, $CuBr_2$ or $CuCl_2$.

Step iv) is preferably carried out directly after step iii), more preferably in the same reactor and preferably in the same reaction mixture. In an embodiment, a mixture of aluminum trichloride and a solvent, e.g. chlorobenzene, is added to the reactor after step iii) has been carried out. After the reaction has completed a solid is allowed to settle which can either be obtained by decanting or filtration and optionally purified or a suspension of which in the solvent can be used for the following step, viz. step v).

The metal modifier is preferably selected from the group of aluminum modifiers (e.g. aluminum halides), boron modifiers (e.g. boron halides), gallium modifiers (e.g. gallium halides), zinc modifiers (e.g. zinc halides), copper modifiers (e.g. copper halides), thallium modifiers (e.g. thallium halides), indium modifiers (e.g. indium halides), vanadium modifiers (e.g. vanadium halides), chromium modifiers (e.g. chromium halides) and iron modifiers (e.g. iron halides).

Examples of suitable modifiers are aluminum trichloride, aluminum tribromide, aluminum triiodide, aluminum trifluoride, boron trichloride, boron tribromide boron triiodide, boron trifluoride, gallium trichloride, gallium tribromide, gallium triiodide, gallium trifluoride, zinc dichloride, zinc dibromide, zinc diiodide, zinc difluoride, copper dichloride, copper dibromide, copper diiodide, copper difluoride, copper chloride, copper bromide, copper iodide, copper fluoride, thallium trichloride, thallium tribromide, thallium triiodide, thallium trifluoride, thallium chloride, thallium bromide, thallium iodide, thallium fluoride, Indium trichloride, indium tribromide, indium triiodide, indium trifluoride, vanadium trichloride, vanadium tribromide, vanadium triiodide, vanadium trifluoride, chromium trichloride, chromium dichloride, chromium tribromide, chromium dibromide, iron dichloride, iron trichloride, iron tribromide, iron dichloride, iron triiodide, iron diiodide, iron trifluoride and iron difluoride.

The amount of metal halide added during step iv) may vary according to the desired amount of metal present in the procatalyst. It may for example range between 0.1 to 5 wt. % based on the total weight of the support, preferably between 0.5 and 1.5 wt. %.

The metal halide is preferably mixed with a solvent prior to the addition to the reaction mixture. The solvent for this step may be selected from for example aliphatic and aromatic hydrocarbons and halogenated aromatic solvents with for instance 4-20 carbon atoms. Examples include toluene, xylene, benzene, decane, o-chlorotoluene and chlorobenzene. The solvent may also be a mixture or two or more thereof.

The duration of the modification step may vary from between 1 minute and 120 minutes, preferably between 40 and 80 minutes, more preferably between 50 and 70 minutes. This time is dependent on the concentration of the modifier, the temperature, the type of solvent used etc.

The modification step is preferably carried out at elevated temperatures (e.g. between 50 and 120° C., preferably between 90 and 110° C.).

The modification step may be carried out while stirring. The mixing speed during the reaction depends on the type and the scale of the reactor used and the scale of the reactor used. The mixing speed can be determined by a person skilled in the art. As a non-limiting example, mixing may be carried at a stirring speed from 100 to 400 rpm, preferably from 150 to 300 rpm, more preferably about 200 rpm).

The wt/vol ratio for the metal halide and the solvent in step iv) is between 0.01 gram-0.1 gram:5.0-100 ml.

The modified intermediate product is present in a solvent. It can be kept in that solvent after which the following step v) is directly carried out. However, it can also be isolated and/or purified. The solid can be allowed to settle by stopping the stirring. The supernatant may be removed by decanting. Otherwise, filtration of the suspension is also possible. The solid product may be washed once or several times with the same solvent used during the reaction or another solvent selected from the same group described above. The solid may be resuspended or may be dried or partially dried for storage.

Subsequent to this step, step v) is carried out to produce the procatalyst according to the present invention.

Step v): Titanation of Intermediate Product

This step is very similar to step iii). It relates to the additional titanation of the modified intermediate product. It is an additional stage of contacting with catalytic species (viz. titanation in this embodiment).

Step v) contacting said modified intermediate product obtained in step iv) with a halogen-containing titanium compound to obtain the procatalyst. When an activator is used during step iii) an internal donor is used during this step.

Step v) is preferably carried out directly after step iv), more preferably in the same reactor and preferably in the same reaction mixture.

In an embodiment, at the end of step iv) or at the beginning of step v) the supernatant is removed from the solid modified intermediate product obtained in step iv) by filtration or by decanting. To the remaining solid, a mixture of titanium halide (e.g. tetrachloride) and a solvent (e.g. chlorobenzene) may be added. The reaction mixture is subsequently kept at an elevated temperature (e.g. between 100 and 130° C., such as 115° C.) for a certain period of time (e.g. between 10 and 120 minutes, such as between 20 and 60 minutes, e.g. 30 minutes). After this, a solid substance is allowed to settle by stopping the stirring.

The molar ratio of the transition metal to the magnesium preferably is between 10 and 100, most preferably, between 10 and 50.

Optionally, an internal electron donor is also present during this step. Also mixtures of internal electron donors can be used. Examples of internal electron donors are disclosed below. The molar ratio of the internal electron donor relative to the magnesium may vary between wide limits, for instance between 0.02 and 0.75. Preferably, this molar ratio is between 0.05 and 0.4; more preferably between 0.1 and 0.4; and most preferably between 0.1 and 0.3.

The solvent for this step may be selected from for example aliphatic and aromatic hydrocarbons and halogenated aromatic solvents with for instance 4-20 carbon atoms. The solvent may also be a mixture or two or more thereof.

According to a preferred embodiment of the present invention this step v) is repeated, in other words, the supernatant is removed as described above and a mixture of titanium halide (e.g. tetrachloride) and a solvent (e.g. chlorobenzene) is added. The reaction is continued at elevated temperatures during a certain time which can be same or different from the first time step v) is carried out.

The step may be carried out while stirring. The mixing speed during the reaction depends on the type of reactor used and the scale of the reactor used. The mixing speed can be determined by a person skilled in the art. This can be the same as discussed above for step iii).

Thus, step v) can be considered to consist of at least two sub steps in this embodiment, being:

v-a) contacting said modified intermediate product obtained in step iv) with titanium tetrachloride—optionally using an internal donor—to obtain a partially titanated procatalyst; (this can e.g. be considered to be stage II as discussed above for a three-stage Phase C)

v-b) contacting said partially titanated procatalyst obtained in step v-a) with titanium tetrachloride to obtain the procatalyst. (this can e.g. be considered to be stage III as discussed above for a three-stage Phase C)

Additional sub steps can be present to increase the number of titanation steps to four or higher (e.g. stages IV, V etc.)

The solid substance (procatalyst) obtained is washed several times with a solvent (e.g. heptane), preferably at elevated temperature, e.g. between 40 and 100° C. depending on the boiling point of the solvent used, preferably between 50 and 70° C. After this, the procatalyst, suspended in solvent, is obtained. The solvent may be removed by filtration or decantation. The procatalyst may be used as such wetted by the solvent or suspended in solvent or it can be first dried, preferably partly dried, for storage. Drying may e.g. be carried out by low pressure nitrogen flow for several hours.

Thus in this embodiment, the total titanation treatment comprises three phases of addition of titanium halide. Wherein the first phase of addition is separated from the second and third phases of addition by the modification with metal halide.

The titanation step (viz. the step of contacting with a titanium halide) according to the present invention is split into two parts and a Group 13- or transition metal modification step is introduced between the two parts or stages of the titanation. Preferably the first part of the titanation comprises one single titanation step and the second part of the titanation comprises two subsequent titanation steps. But different procedures may be used. When this modification is carried out before the titanation step the increase in activity was higher as observed by the inventors. When this modification is carried out after the titanation step the increase in activity was less as observed by the present inventors.

In short, an embodiment of the present invention comprises the following steps: i) preparation of first intermediate reaction product; ii) activation of solid support to yield second intermediate reaction product; iii) first titanation or Stage I to yield third intermediate reaction product; iv) modification to yield modified intermediate product; v) second titanation or Stage II/III to yield the procatalyst. The procatalyst is combined with DEATES as external donor to prepare the catalyst system according to the present invention.

The procatalyst may have a titanium, hafnium, zirconium, chromium or vanadium (preferably titanium) content of from about 0.1 wt. % to about 6.0 wt. %, based on the total solids weight, or from about 1.0 wt. % to about 4.5 wt. %, or from about 1.5 wt. % to about 3.5 wt. %. Weight percent is based on the total weight of the procatalyst.

The weight ratio of titanium, hafnium, zirconium, chromium or vanadium (preferably titanium) to magnesium in the solid procatalyst may be between about 1:3 and about 1:160, or between about 1:4 and about 1:50, or between about 1:6 and 1:30.

The transition metal-containing solid catalyst compound according to the present invention comprises a transition metal halide (e.g. titanium halide, chromium halide, hafnium halide, zirconium halide or vanadium halide) supported on a metal or metalloid compound (e.g. a magnesium compound or a silica compound).

Preferably, a magnesium-based or magnesium-containing support is used in the present invention. Such a support is prepared from magnesium-containing support-precursors, such as magnesium halides, magnesium alkyls and magnesium aryls, and also magnesium alkoxy and magnesium aryloxy compounds.

The support may be activated using activation compounds as described in more detail above under Phase B.

The catalyst may further be activated during Phase C as discussed above for the process. This activation increases the yield of the resulting catalyst composition in olefin polymerization.

Several activators can be used, such as benzamide, alkylbenzoates, and monoesters.

Each of these will be discussed below.

A benzamide activator has a structure according to Formula X:

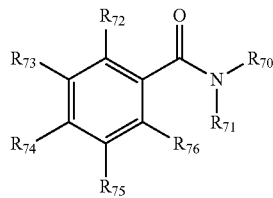

Formula X $R^{70}$ and $R^{71}$ are each independently selected from hydrogen or an alkyl. Preferably, said alkyl has between 1 and 6 carbon atoms, more preferably between 1-3 carbon atoms. More preferably, $R^{70}$ and $R^{71}$ are each independently selected from hydrogen or methyl.

$R^{72}$, $R^{73}$, $R^{74}$, $R^{75}$, $R^{76}$ are each independently selected from hydrogen, a heteroatom (preferably a halide), or a hydrocarbyl group, selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms.

Suitable non-limiting examples of "benzamides" include benzamide ($R^{70}$ and $R^{71}$ are both hydrogen and each of $R^{72}$, $R^{73}$, $R^{74}$, $R^{75}$, $R^{76}$ are hydrogen) also denoted as BA-2H or methylbenzamide ($R^{70}$ is hydrogen; $R^{71}$ is methyl and each of $R^{72}$, $R^{73}$, $R^{74}$, $R^{75}$, $R^{76}$ are hydrogen) also denoted as BA-HMe or dimethylbenzamide ($R^{70}$ and $R^{71}$ are methyl and each of $R^{72}$, $R^{73}$, $R^{74}$, $R^{75}$, $R^{76}$ are hydrogen) also denoted as BA-2Me. Other examples include monoethylbenzamide, diethylbenzamide, methylethylbenzamide, 2-(trifluormethyl)-benzamide, N,N-dimethyl-2-(trifluormethyl)benzamide, 3-(trifluormethyl)benzamide, N,N-dimethyl-3-(trifluormethyl)benzamide, 2,4-di hydroxy-N-(2-hydroxyethyl)benzamide, N-(1H-benzotriazol-1-ylmethyl) benzamide, 1-(4-ethylbenzoyl)piperazine, 1-benzoylpiperidine.

It has surprisingly been found by the present inventors that when the benzamide activator is added during the first stage of the process together with the catalytic species or directly after the addition of the catalytic species (e.g. within 5 minutes) an even higher increase in the yield is observed compared to when the activator is added during stage II or stage III of the process.

It has surprisingly been found by the present inventors that the benzamide activator having two alkyl groups (e.g. dimethylbenzamide or diethylbenzamide, preferably dimethylbenzamide) provides an even higher increase in the yield than either benzamide or monoalkyl benzamide.

Without wishing to be bound by a particular theory the present inventors believe that the fact that the most effective activation is obtained when the benzamide activator is added during stage I has the following reason. It is believed that the benzamide activator will bind the catalytic species and is later on substituted by the internal donor when the internal donor is added.

Alkylbenzoates may be used as activators. The activator may hence be selected from the group alkylbenzoates having an alkylgroup having between 1 and 10, preferably between 1 and 6 carbon atoms. Examples of suitable alkyl benzoates are methylbenzoate, ethylbenzoate according to Formula II, n-propylbenzoate, iso-propylbenzoate, n-butylbenzoate, 2-butylbenzoate, t-butylbenzoate.

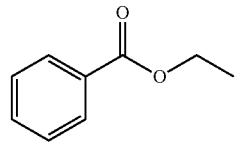

Formula II

More preferably, the activator is ethylbenzoate. In a even more preferred embodiment, ethylbenzoate as activator is added during step iii) and a benzamide internal donor is added during step v), most preferably 4-[benzoyl(methyl)amino]pentan-2-yl benzoate according to Formula XII:

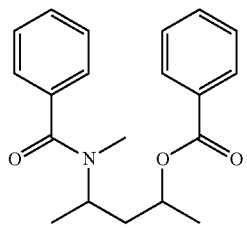

Formula XII

Mono-esters may be used as activators. The monoester according to the present invention can be any ester of a monocarboxylic acid known in the art. The structures according to Formula V are also mono-esters but are not explained in this section, see the section on Formula V. The monoester can have the formula XXIII

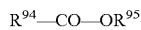  Formula XXIII $R^{94}$ and $R^{95}$ are each independently a hydrocarbyl group selected e.g. from alkyl, alkenyl, aryl, aralkyl, alkoxycarbonyl or alkylaryl groups, and one or more combinations thereof. $R^{94}$ may be a hydrogen. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms. When $R^{94}$ is an aryl, this structure is similar to Formula V. Examples of aromatic mono-esters are discussed with reference to formula V.

Preferably said mono-ester is an aliphatic monoester. Suitable examples of mono-esters include formates, for instance, butyl formate; acetates, for instance ethyl acetate, amyl acetate and butyl acetate; acrylates, for instance ethyl acrylate, methyl methacrylate and isobutyl methacrylate. More preferably, the aliphatic monoester is an acetate. Most preferably, the aliphatic monoester is ethyl acetate.

In an embodiment, the monoester used in step iii) is an ester of an aliphatic monocarboxylic acid having between 1 and 10 carbon atoms. Wherein $R^{94}$ is an aliphatic hydrocarbyl group.

The molar ratio between the monoester in step iii) and Mg may range from 0.05 to 0.5, preferably from 0.1 to 0.4, and most preferably from 0.15 to 0.25.

The monoester is not used as a stereospecificity agent, like usual internal donors are known to be in the prior art. The monoester is used as an activator.

Without to be bound by any theory, the inventors believe that the monoester used in the process according to the present invention participates at the formation of the magnesium halogen (e.g. MgCl$_2$) crystallites during the interaction of Mg-containing support with titanium halogen (e.g. TiCl$_4$). The monoester may form intermediate complexes with Ti and Mg halogen compounds (for instance, TiCl$_4$, TiCl$_3$(OR), MgCl$_2$, MgCl(OEt), etc.), help to the removal of titanium products from solid particles to mother liquor and affect the activity of final catalyst. Therefore, the monoester according to the present invention can also be referred to as an activator.

As used herein, an "internal electron donor" or an "internal donor" is a compound added during formation of the procatalyst that donates a pair of electrons to one or more metals present in the resultant procatalyst. Not bounded by any particular theory, it is believed that the internal electron donor assists in regulating the formation of active sites thereby enhancing catalyst stereoselectivity.

The internal electron donor can be any compound known in the art to be used as internal electron donor. Suitable examples of internal donors include aromatic acid esters, such as monocarboxylic acid ester or dicarboxylic acid esters (e.g. ortho-dicarboxylic acid esters such as phthalic acid esters), (N-alkyl)amidobenzoates, 1,3-diethers, silyl esters, fluorenes, succinates and/or combinations thereof.

It is preferred to use so-called phthalate free internal donors because of increasingly stricter government regulations about the maximum phthalate content of polymers. This leads to an increased demand in phthalate free catalyst compositions. In the context of the present invention, "essentially phthalate-free" of "phthalate-free" means having a phthalate content of less than for example 150 ppm, alternatively less than for example 100 ppm, alternatively less than for example 50 ppm, alternatively for example less than 20 ppm.

An aromatic acid ester can be used as internal donor.

As used herein, an "aromatic acid ester" is a monocarboxylic acid ester (also called "benzoic acid ester") as shown in Formula V, a dicarboxylic acid ester (e.g. an o-dicarboxylic acid also called "phthalic acid ester") as shown in Formula VI:

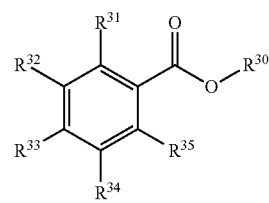

Formula V $R^{30}$ is selected from a hydrocarbyl group independently selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms. Suitable examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

$R^{31}$, $R^{32}$, $R^{33}$, $R^{34}$, $R^{35}$ are each independently selected from hydrogen, a heteroatom (preferably a halide), or a hydrocarbyl group, selected from e.g. alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms.

Suitable non-limiting examples of "benzoic acid esters" include an alkyl p-alkoxybenzoate (such as ethyl p-methoxybenzoate, methyl p-ethoxybenzoate, ethyl p-ethoxybenzoate), an alkyl benzoate (such as ethyl benzoate, methyl benzoate), an alkyl p-halobenzoate (ethyl p-chlorobenzoate, ethyl p-bromobenzoate), and benzoic anhydride. The benzoic acid ester is preferably selected from ethyl benzoate, benzoyl chloride, ethyl p-bromobenzoate, n-propyl benzoate and benzoic anhydride. The benzoic acid ester is more preferably ethyl benzoate.

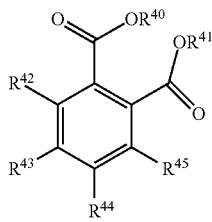

Formula VI $R^{40}$ and $R^{41}$ are each independently a hydrocarbyl group selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms. Suitable examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

$R^{42}$, $R^{43}$, $R^{44}$, $R^{45}$ are each independently selected from hydrogen, a halide or a hydrocarbyl group, selected from e.g. alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms.

Suitable non-limiting examples of phthalic acid esters include dimethyl phthalate, diethyl phthalate, di-n-propyl phthalate, diisopropyl phthalate, di-n-butyl phthalate, diisobutyl phthalate, di-t-butyl phthalate, diisoamyl phthalate, di-t-amyl phthalate, dineopentyl phthalate, di-2-ethylhexyl phthalate, di-2-ethyldecyl phthalate, bis(2,2,2-trifluoroethyl) phthalate, diisobutyl 4-t-butylphthalate, and diisobutyl 4-chlorophthalate. The phthalic acid ester is preferably di-n-butyl phthalate or diisobutyl phthalate.

As used herein a "di-ether" may be a 1,3-di(hydrocarboxy)propane compound, optionally substituted on the 2-position represented by the Formula VII,

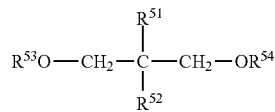

Formula VII $R^{51}$ and $R^{52}$ are each independently selected from a hydrogen or a hydrocarbyl group selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms. Suitable examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

$R^{53}$ and $R^{54}$ are each independently a hydrocarbyl group, selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms.

Preferably, said hydrocarbyl group has between 1 and 10 carbon atoms, more preferably between 1-8 carbon atoms, even more preferably between 1 and 6 carbon atoms.

Suitable examples of dialkyl diether compounds include 1,3-dimethoxypropane, 1,3-diethoxypropane, 1,3-dibutoxypropane, 1-methoxy-3-ethoxypropane, 1-methoxy-3-butoxypropane, 1-methoxy-3-cyclohexoxypropane, 2,2-dimethyl-1,3-dimethoxypropane, 2,2-diethyl-1,3-dimethoxypropane, 2,2-di-n-butyl-1,3-dimethoxypropane, 2,2-diiso-butyl-1,3-dimethoxypropane, 2-ethyl-2-n-butyl-1,3-dimethoxypropane, 2-n-propyl-2-cyclopentyl-1,3-dimethoxypropane, 2,2-dimethyl-1,3-diethoxypropane, 2-n-propyl-2-cyclohexyl-1,3-diethoxypropane, 2-(2-ethylhexyl)-1,3-dimethoxypropane, 2-isopropyl-1,3-dimethoxypropane, 2-n-butyl-1,3-dimethoxypropane, 2-sec-butyl-1,3-dimethoxypropane, 2-cyclohexyl-1,3-dimethoxypropane, 2-phenyl-1,3-diethoxypropane, 2-cumyl-1,3-diethoxypropane, 2-(2-phenyllethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(fluorophenyl)-1,3-dimethoxypropane, 2-(1-decahydronaphthyl)-1,3-dimethoxypropane, 2-(p-t-butylphenyl)-1,3-dimethoxypropane, 2,2-dicyclohexyl-1,3-dimethoxypropane, 2,2-di-n-propyl-1,3-dimethoxypropane, 2-methyl-2-n-propyl-1,3-dimethoxypropane, 2-methyl-2-benzyl-1,3-dimethoxypropane, 2-methyl-2-ethyl-1,3-dimethoxypropane, 2-methyl-2-phenyl-1,3-dimethoxypropane, 2-methyl-2-cyclohexyl-1,3-dimethoxypropane, 2,2-bis(pchlorophenyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2-methyl-2-isopropyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2,2-diisobutyl-1,3-diethoxypropane, 2,2-diisobutyl-1,3-di-n-butoxypropane, 2-isobutyl-2-isopropyl-1,3-dimethoxypropane, 2,2-di-sec-butyl-1,3-dimethoxypropane, 2,2-di-t-butyl-1,3-dimethoxypropane, 2,2-dineopentyl-1,3-dimethoxypropane, 2-isopropyl-2-isopentyl-1,3-dimethoxypropane, 2-phenyl-2-benzyl-1,3-dimethoxypropane, 2-cyclohexyl-2-cyclohexylmethyl-1,3-dimethoxypropane, 2-isopropyl-2-(3,7-dimethyloctyl) 1,3-dimethoxypropane, 2,2-diisopropyl-1,3-dimethoxypropane, 2-isopropyl-2-cyclohexylmethyl-1,3-dimethoxypropane, 2,2-diisopentyl-1,3-dimethoxypropane, 2-isopropyl-2-cyclohexyl-1,3-dimethoxypropane, 2-isopropyl-2-cyclopentyl-1,3-dimethoxypropane, 2,2-dicylopentyl-1,3-dimethoxypropane, 2-n-heptyl-2-n-pentyl-1,3-dimethoxypropane, 9,9-bis(methoxymethyl)fluorene, 1,3-dicyclohexyl-2,2-bis(methoxymethyl)propane, 3,3-bis(methoxymethyl)-2,5-dimethylhexane, or any combination of the foregoing. In an embodiment, the internal electron donor is 1,3-dicyclohexyl-2,2-bis(methoxymethyl)propane, 3,3-bis(methoxymethyl)-2,5-dimethylhexane, 2,2-dicyclopentyl-1,3-dimethoxypropane and combinations thereof.

Examples of preferred ethers are diethyl ether, dibutyl ether, diisoamyl ether, anisole and ethylphenyl ether, 2,3-dimethoxypropane, 2,3-dimethoxypropane, 2-ethyl-2-butyl-1,3-dimethoxypropane, 2-isopropyl-2-isopentyl-1,3-dimethoxypropane and 9,9-bis (methoxymethyl) fluorene:

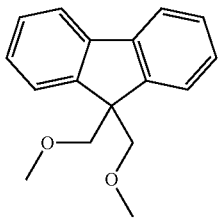 [SMILES: COCC1(COC)c2ccccc2-c2ccccc21]

As used herein a "succinate acid ester" is a 1,2-dicarboxyethane and can be used as internal donor, according to Formula VIII:

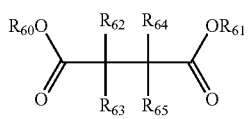

Formula VIII $R^{60}$ and $R^{61}$ are each independently a hydrocarbyl group, selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms.

$R^{62}$, $R^{63}$, $R^{64}$, and $R^{65}$ are each independently selected from hydrogen or a hydrocarbyl group, selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms.

More preferably, $R^{62}$, $R^{63}$, $R^{64}$, and $R^{65}$ are independently selected from a group consisting of hydrogen, $C_1$-$C_{10}$ straight and branched alkyl; $C_3$-$C_{10}$ cycloalkyl; $C_6$-$C_{10}$ aryl; and $C_7$-$C_{10}$ alkaryl and aralkyl group.

Even more preferably, $R^{62}$, $R^{63}$, $R^{64}$, and $R^{65}$ are independently selected from a group consisting of hydrogen, methyl, ethyl, n-propyl, iso-propyl, n-butyl, sec-butyl, isobutyl, t-butyl, phenyl trifluoromethyl and halophenyl group. Most preferably, one of $R^{62}$ and $R^{63}$ is selected from methyl, ethyl, n-propyl, iso-propyl, n-butyl, sec-butyl, iso-butyl, t-butyl, whereas the other is a hydrogen atom; and one of $R^{64}$ and $R^{65}$ is selected from methyl, ethyl, n-propyl, iso-propyl, n-butyl, sec-butyl, iso-butyl, t-butyl, whereas the other is a hydrogen atom Suitable examples of succinate acid ester include diethyl 2,3-di-isopropylsuccinate, diethyl 2,3-di-n-propylsuccinate, diethyl 2,3-di-isobutylsuccinate, diethyl 2,3-di-sec-butylsuccinate, dimethyl 2,3-di-isopropylsuccinate, dimethyl 2,3-di-n-propylsuccinate, dimethyl 2,3-di-isobutylsuccinate, dimethyl 2,3-di-sec-butylsuccinate.

Examples of other organic compounds containing a heteroatom are thiophenol, 2-methylthiophene, isopropyl mercaptan, diethylthioether, diphenylthio-ether, tetrahydrofuran, dioxane, anisole, acetone, triphenylphosphine, triphenylphosphite, diethylphosphate and diphenylphosphate.

The silyl ester as internal donor can be any silyl ester or silyl diol ester known in the art, for instance as disclosed in US 2010/0130709.

When an aminobenzoate (AB) according to Formula XI is used as an internal donor this ensures a better control of stereochemistry and allows preparation of polyolefins having a broader molecular weight distribution.

Aminobenzoates suitable as internal donor according to the present invention are the compounds represented by Formula XI:

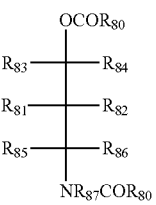

Formula XI

Wherein $R^{80}$ is an aromatic group, selected from aryl or alkylaryl groups and may be substituted or unsubstituted. Said aromatic group may contain one or more heteroatoms. Preferably, said aromatic group has between 6 and 20 carbon atoms. It should be noted that the two $R^{80}$ groups may be the same but may also be different.

$R^{80}$ can be the same or different than any of $R^{81}$-$R^{87}$ and is preferably an aromatic substituted and unsubstituted hydrocarbyl having 6 to 10 carbon atoms.

More preferably, $R^{80}$ is selected from the group consisting of $C_6$-$C_{10}$ aryl unsubstituted or substituted with e.g. an acylhalide or an alkoxyde; and $C_7$-$C_{10}$ alkaryl and aralkyl group; for instance, 4-methoxyphenyl, 4-chlorophenyl, 4-methylphenyl.

Particularly preferred, $R^{80}$ is substituted or unsubstituted phenyl, benzyl, naphthyl, ortho-tolyl, para-tolyl or anisol group. Most preferably, $R^{80}$ is phenyl.

$R^{81}$, $R^{82}$, $R^{83}$, $R^{84}$, $R^{85}$, and $R^{86}$ are each independently selected e.g. from hydrogen or a hydrocarbyl group, selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms.

More preferably, $R^{81}$, $R^{82}$, $R^{83}$, $R^{84}$, $R^{85}$, and $R^{86}$ are independently selected from a group consisting of hydrogen, $C_1$-$C_{10}$ straight and branched alkyl; $C_3$-$C_{10}$ cycloalkyl; $C_6$-$C_{10}$ aryl; and $C_7$-$C_{10}$ alkaryl and aralkyl group.

Even more preferably, $R^{81}$, $R^{82}$, $R^{83}$, $R^{84}$, $R^{85}$, and $R^{86}$ are independently selected from a group consisting of hydrogen, methyl, ethyl, propyl, isopropyl, butyl, t-butyl, phenyl, trifluoromethyl and halophenyl group.

Most preferably, $R^{81}$, $R^{82}$, $R^{83}$, $R^{84}$, $R^{85}$, and $R^{86}$ are each hydrogen, methyl, ethyl, propyl, t-butyl, phenyl or trifluoromethyl.

Preferably, $R^{81}$ and $R^{82}$ is each a hydrogen atom.

More preferably, $R^{81}$ and $R^{82}$ is each a hydrogen atom and each of $R^{83}$, $R^{84}$, $R^{85}$, and $R^{86}$ is selected from the group consisting of hydrogen, $C_1$-$C_{10}$ straight and branched alkyls; $C_3$-$C_{10}$ cycloalkyls; $C_6$-$C_{10}$ aryls; and $C_7$-$C_{10}$ alkaryl and aralkyl group.

Preferably, at least one of $R^{83}$ and $R^{84}$ and at least one of $R^{85}$ and $R^{86}$ is a hydrocarbyl group having at least one carbon atom, being selected from the group as defined above.

More preferably, when at least one of $R^{83}$ and $R^{84}$ and one of $R^{85}$ and $R^{86}$ is a hydrocarbyl group having at least one carbon atom then the other one of $R_3$ and $R_4$ and of $R^{85}$ and $R^{86}$ is each a hydrogen atom.

Most preferably, when one of $R^{83}$ and $R^{84}$ and one of $R^{85}$ and $R^{86}$ is a hydrocarbyl group having at least one carbon atom, then the other one of $R^{83}$ and $R^{84}$ and of $R^{85}$ and $R^{86}$ is each a hydrogen atom and $R^{81}$ and $R^{82}$ is each a hydrogen atom.

Preferably, $R^{81}$ and $R^{82}$ is each a hydrogen atom and one of $R^{83}$ and $R^{84}$ and one of $R^{85}$ and $R^{86}$ is selected from the group consisting of $C_1$-$C_{10}$ straight and branched alkyl; $C_3$-$C_{10}$ cycloalkyl; $C_6$-$C_{10}$ aryl; and $C_7$-$C_{10}$ alkaryl and aralkyl group;

More preferably $R^{85}$ and $R^{86}$ is selected from the group consisting of $C_1$-$C_{10}$ alkyl, such as methyl, ethyl, propyl, isopropyl, butyl, t-butyl, phenyl, trifluoromethyl and halophenyl group; and most preferably, one of $R^{83}$ and $R^{84}$, and one of $R^{85}$ and $R^{86}$ is methyl $R^{87}$ is a hydrogen or a hydrocarbyl group, selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms, more preferably between 1 and 10 carbon atoms. $R^{87}$ may be the same or different than any of $R^{81}$, $R^{82}$, $R^{83}$, $R^{84}$, $R^{85}$, and $R^{86}$ with the provision that $R^{87}$ is not a hydrogen atom.

More preferably, $R^{87}$ is selected from a group consisting of $C_1$-$C_{10}$ straight and branched alkyl; $C_3$-$C_{10}$cycloalkyl; $C_6$-$C_{10}$ aryl; and $C_7$-$C_{10}$ alkaryl and aralkyl group.

Even more preferably, $R^{87}$ is selected from a group consisting of methyl, ethyl, propyl, isopropyl, butyl, t-butyl, phenyl, benzyl and substituted benzyl and halophenyl group.

Most preferably, $R^{87}$ is methyl, ethyl, propyl, isopropyl, benzyl or phenyl; and even most preferably, $R^{87}$ is methyl, ethyl or propyl.

Without being limited thereto, particular examples of the compounds of formula (XI) are the structures as depicted in formulas (XII)-(XXII). For instance, the structure in Formula (XII) may correspond to 4-[benzoyl(methyl)amino]pentan-2-yl benzoate; Formula (XIII) to 3-[benzoyl(cyclohexyl)amino]-1-phenylbutyl benzoate; Formula (XIV) to 3-[benzoyl(propan-2-yl)amino]-1-phenylbutyl benzoate; Formula (XV) to 4-[benzoyl(propan-2-yl)amino]pentan-2-yl benzoate; Formula (XVI) to 4-[benzoyl(methyl)amino]-1,1,1-trifluoropentan-2-yl benzoate; Formula (XVII) to 3-(methylamino)-1,3-diphenylpropan-1-oldibenzoate; Formula (XVIII) to 2,2,6,6-tetramethyl-5-(methylamino)heptan-3-ol dibenzoate; Formula (XIX) to 4-[benzoyl (ethyl)amino]pentan-2-yl benzoate; Formula (XX) to 3-(methyl)amino-propan-1-ol dibenzoate; Formula (XXI) to 3-(methyl)amino-2,2-dimethylpropan-1-ol dibenzoate; Formula (XXII) to 4-(methylamino)pentan-2-yl bis (4-methoxy)benzoate).

It has been surprisingly found that the catalyst composition comprising the compound of formula (XI) as an internal electron donor shows better control of stereochemistry and allows preparation of polyolefins, particularly of polypropylenes having broader molecular weight distribution and higher isotacticity.

Preferably, the catalyst composition according to the invention comprises the compound having formula (XI) as the only internal electron donor in a Ziegler-Natta catalyst composition.

The compounds of formula (XII), (XIX), (XXII) and (XVIII) are the most preferred internal electron donors in the catalyst composition according to the present invention as they allow preparation of polyolefins having broader molecular weight distribution and higher isotacticity.

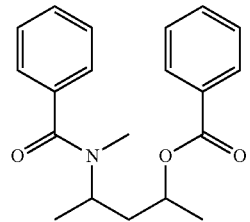

Formula (XII)

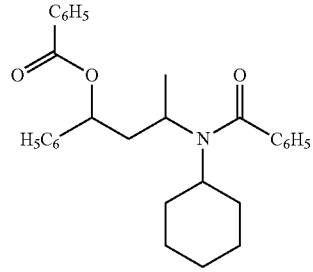

Formula (XIII)

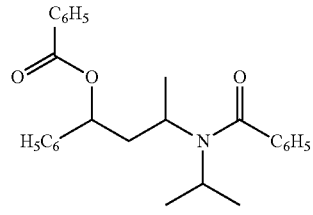

Formula (XIV)

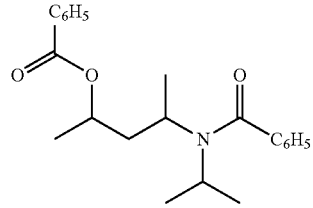

Formula (XV)

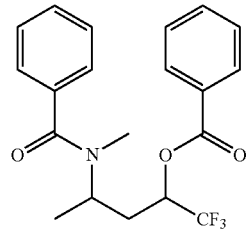

Formula (XVI)

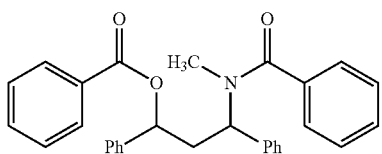

Formula (XVII)

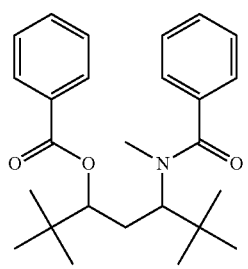

Formula (XVIII)

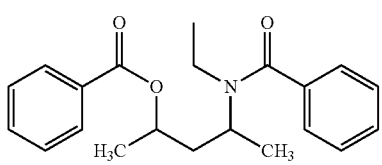

Formula (XIX)

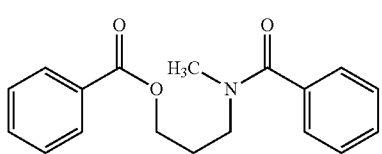

Formula (XX)

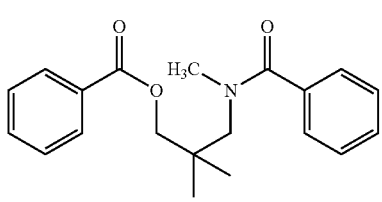

Formula (XXI)

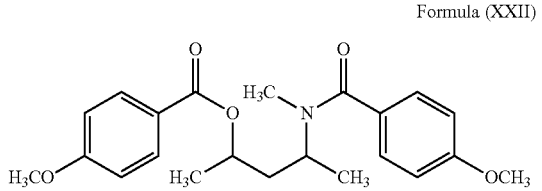

Formula (XXII)

The compound according to formula (XI) can be made by any method known in the art. In this respect, reference is made to J. Chem. Soc. Perkin trans. I 1994, 537-543 and to Org. Synth. 1967, 47, 44. These documents disclose a step a) of contacting a substituted 2,4-diketone with a substituted amine in the presence of a solvent to give a β-enaminoketone; followed by a step b) of contacting the β-enaminoketone with a reducing agent in the presence of a solvent to give a γ-aminoalcohol. The substituted 2,4-diketone and the substituted amine can be applied in step a) in amounts ranging from 0.5 to 2.0 mole, preferably from 1.0 to 1.2 mole. The solvent in steps a) and b) may be added in an amount of 5 to 15 volume, based on the total amount of the diketone, preferably of 3 to 6 volume. The β-enaminoketone to diketone mole ratio in step b) may be of from 0.5 to 6, preferably from 1 to 3. The reducing agent to β-enaminoketone mole ratio in step b) may be of from 3 to 8, preferably from 4 to 6; the reducing agent may be selected from the group comprising metallic sodium, NaBH$_4$ in acetic acid, Ni—Al alloy. Preferably, the reducing agent is metallic sodium because it is a cheap reagent.

The γ-aminoalcohol that can be used for making compound (XI) can be synthesized as described in the literature and also mentioned herein above or this compound can be directly purchased commercially and used as a starting compound in a reaction to obtain the compound represented by formula (XI). Particularly, the γ-aminoalcohol can be reacted with a substituted or unsubstituted benzoyl chloride in the presence of a base to obtain the compound represented by formula (XI)(referred herein also as step c), regardless that γ-aminoalcohol was synthesized as described in the literature or commercially purchased). The molar ratio between the substituted or unsubstituted benzoyl chloride and the γ-aminoalcohol may range from 2 to 4, preferably from 2 to 3. The base may be any basic chemical compound that is able to deprotonate the γ-aminoalcohol. Said base can have a pK$_a$ of at least 5; or at least 10 or preferably between 5 and 40, wherein pK$_a$ is a constant already known to the skilled person as the negative logarithm of the acid dissociation constant k$_a$. Preferably, the base is pyridine; a trialkyl amine, e.g. triethylamine; or a metal hydroxide e.g. NaOH, KOH. Preferably, the base is pyridine. The molar ratio between the base and the γ-aminoalcohol may range from 3 to 10, preferably from 4 to 6.

The solvent used in any of steps a), b) and c) can be selected from any organic solvents, such as toluene, dichloromethane, 2-propanol, cyclohexane or mixtures of any organic solvents. Preferably, toluene is used in each of steps a), b) and c). More preferably, a mixture of toluene and 2-propanol is used in step b). The solvent in step c) can be added in an amount of 3 to 15 volume, preferably from 5 to 10 volume based on the γ-aminoalcohol.

The reaction mixture in any of steps a), b) and c) may be stirred by using any type of conventional agitators for more than about 1 hour, preferably for more than about 3 hours and most preferably for more than about 10 hours, but less than about 24 hours. The reaction temperature in any of steps a) and b) may be the room temperature, i.e. of from about 15 to about 30° C., preferably of from about 20 to about 25° C. The reaction temperature in step c) may range between 0 and 10° C., preferably between 5 and 10° C. The reaction mixture in any of steps a), b) and c) may be refluxed for more than about 10 hours, preferably for more than about 20 hours but less than about 40 hours or until the reaction is complete (reaction completion may be measured by Gas Chromatography, GC).

The reaction mixture of steps a) and b) may be then allowed to cool to room temperature, i.e. at a temperature of from about 15 to about 30° C., preferably of from about 20 to about 25° C. The solvent and any excess of components may be removed in any of steps a), b) and c) by any method known in the art, such as evaporation or washing. The obtained product in any of steps b) and c) can be separated from the reaction mixture by any method known in the art, such as by extraction over metal salts, e.g. sodium sulfate.

The molar ratio of the internal donor of formula (XI) relative to the magnesium can be from 0.02 to 0.5. Preferably, this molar ratio is between 0.05 and 0.2.

A benzamide can be used as internal donor. Suitable compounds have a structure according to formula X:

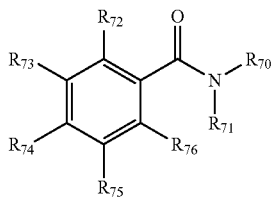

$R^{70}$ and $R^{71}$ are each independently selected from hydrogen or an alkyl. Preferably, said alkyl has between 1 and 6 carbon atoms, more preferably between 1-3 carbon atoms. More preferably, $R^{70}$ and $R^{71}$ are each independently selected from hydrogen or methyl.

$R^{72}$, $R^{73}$, $R^{74}$, $R^{75}$, $R^{76}$ are each independently selected from hydrogen, a heteroatom (preferably a halide), or a hydrocarbyl group, selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms.

Suitable non-limiting examples of "benzamides" include benzamide ($R^{70}$ and $R^{71}$ are both hydrogen and each of $R^{72}$, $R^{73}$, $R^{74}$, $R^{75}$, $R^{76}$ are hydrogen) also denoted as BA-2H or methylbenzamide ($R^{70}$ is hydrogen; $R^{71}$ is methyl and each of $R^{72}$, $R^{73}$, $R^{74}$, $R^{75}$, $R^{76}$ are hydrogen) also denoted as BA-HMe or dimethylbenzamide ($R^{70}$ and $R^{71}$ are methyl and each of $R^{72}$, $R^{73}$, $R^{74}$, $R^{75}$, $R^{76}$ are hydrogen) also denoted as BA-2Me. Other examples include monoethylbenzamide, diethylbenzamide, methylethylbenzamide, 2-(trifluormethyl)-benzamide, N,N-dimethyl-2-(trifluormethyl)benzamide, 3-(trifluormethyl)-benzamide, N,N-dimethyl-3-(trifluormethyl)benzamide, 2,4-dihydroxy-N-(2-hydroxyethyl)-benzamide, N-(1H-benzotriazol-1-ylmethyl) benzamide, 1-(4-ethylbenzoyl)piperazine, 1-benzoylpiperidine.

As discussed in WO 2013124063 1,5-diesters according to Formula XXV can be used as internal donors. These 1,5-diesters have two chiral centers on their C2 and C4 carbon atoms. Four isomers exist, being the 2R, 4S meso isomer, the 2S, 4R meso isomers and the 2S, 4S and 2R, 4R isomers. A mixture of all of them is called "rac" diester.

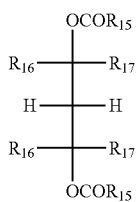

Formula XXV $R^{15}$ is independently a hydrocarbyl group independently selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms.

$R^{16}$ and $R^{17}$ are different with respect to each other. Both $R^{16}$ groups may be the same or different. Both $R^{17}$ groups may be the same or different. The $R^{16}$ and $R^{17}$ groups and independently selected from the group consisting of hydrogen, halogen, and hydrocarbyl group independently selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms.

An example of a compound according to formula XXV is pentanediol dibenzoate.

The compound according to Formula XXV has two stereocenters (at C2 and C4), comprises two so-called stereocenters each giving rise to two different configurations and thus to a total of four stereoisomers. There are two sets of diastereomers (or diastereoisomers), each comprising two enantiomers. Enantiomers differ in both stereocenters and are therefore mirror images of one another.

The $R^{16}$ and the $R^{17}$ groups may be switched in position. In other words, the mirror image of the compound of Formula XXV having the two $R^{17}$ groups on the left hand of the structure. The compound in formula XXV is the (2R, 4S) meso-isomer whereas the mirror image (not shown) is the (2S, 4R) meso-isomer. The compound of Formula XXV is a meso-isomer, i.e. it contains two stereocenters (chiral centers) but it is not chiral.

The following two other isomers are possible: a (2S, 4S)-isomer (not shown), a (2R, 4R)-isomer (not shown). R and S illustrate the chiral centers of the molecules, as known to the skilled person. When a mixture of 2S, 4S and 2R, 4R is present, this is called "rac". These internal donors are disclosed in detail in WO 2013/124063 which shows Fisher projections of all isomers.

In an embodiment, at least one group of $R^{16}$ and $R^{17}$ may be selected from the group consisting of hydrogen, halogen, C1-C10 linear or branched alkyl, C3-C10 cycloalkyl, C6-C10 aryl, and C7-C10 alkaryl or aralkyl group. More preferably, at least one group of $R^{16}$ and $R^{17}$ is selected from the group consisting of hydrogen, methyl, ethyl, propyl, isopropyl, butyl, t-butyl, phenyl, and halophenyl group.

Preferably, either $R^{16}$ and $R^{17}$ represents hydrogen. More preferably, $R^{16}$ and $R^{17}$ represent a methyl or an ethyl group. Particularly preferred is when either of $R^{16}$ and $R^{17}$ represents hydrogen and the other $R^{16}$ and $R^{17}$ represents a methyl or an ethyl group.

$R^{15}$ is preferably independently selected from benzene-ring containing groups, such as phenyl, phenyl substituted by alkyl, alkoxy or halogen; optionally the carbon atom(s) on the benzene ring being replaced by a hetero-atom of oxygen atom and/or nitrogen atom; alkenyl or phenyl substituted alkenyl, such as vinyl, propenyl, styryl; alkyl, such as methyl, ethyl, propyl, etc.

More preferably, $R^{15}$ represents a phenyl group. Particularly preferred is meso pentane-2,4-diol dibenzoate (mPDDB).

The catalyst system according to the present invention includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990).

The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst represented by the formula $R^{20}{}_3Al$.

$R^{20}$ is independently selected from a hydrogen or a hydrocarbyl, selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms, more preferably between 1-12 carbon atoms, even more preferably between 1 and 6 carbon atoms. On the proviso that at least one $R^{20}$ is a hydrocarbyl group. Optionally, two or three $R^{20}$ groups are joined in a cyclic radical forming a heterocyclic structure.

Non-limiting examples of suitable $R^{20}$ groups are: methyl, ethyl, propyl, isopropyl, butyl, isobutyl, t-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, phenyl, phenethyl, methoxyphenyl, benzyl, tolyl, xylyl, naphthyl, methylnapthyl, cyclohexyl, cycloheptyl, and cyclooctyl.

Suitable examples of the hydrocarbyl aluminum compounds as co-catalyst include triisobutylaluminum (TIBA), trihexylaluminum, di-isobutylaluminum hydride (DIBALH), dihexylaluminum hydride, isobutylaluminum dihydride, hexylaluminum dihydride, diisobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. In an embodiment, the cocatalyst is selected from triethylaluminum, triisobutylaluminum, trihexylaluminum, di-isobutylaluminum hydride and dihexylaluminum hydride. More preferably, trimethylaluminum, triethylaluminum, triisobutylaluminum, and/or trioctylaluminum. Most preferably, triethylaluminum (abbreviated as TEAL).

The co-catalyst can also be a hydrocarbyl aluminum compound represented by the formula $R^{21}{}_m AlX^{21}{}_{3-m}$.

$R^{21}$ is an alkyl group. Said alkyl group may be linear, branched or cyclic. Said alkyl group may be substituted or unsubstituted. Preferably, said alkyl group has between 1 and 20 carbon atoms, more preferably between 1-12 carbon atoms, even more preferably between 1 and 6 carbon atoms.

Non-limiting examples of suitable $R^{21}$ groups are: methyl, ethyl, propyl, isopropyl, butyl, isobutyl, t-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, and dodecyl.

$X^{21}$ is selected from the group of consisting of fluoride (F—), chloride (Cl—), bromide (Br—) or iodide (I—) or an alkoxide (RO−). The value for m is preferably 1 or 2.

Non-limiting examples of suitable alkyl aluminum halide compounds for co-catalyst include tetraethyl-dialuminoxane, methylaluminoxane, isobutylaluminoxane, tetraisobutyldialuminoxane, diethyl-aluminumethoxide, diisobutyl-aluminum chloride, methylaluminum dichloride, diethylaluminum chloride, ethylaluminum dichloride and dimethylaluminum chloride.

Non-limiting examples of suitable compounds include tetraethyldialuminoxane, methylaluminoxane, isobutylaluminoxane, tetraisobutyldialuminoxane, diethylaluminum ethoxide, diisobutylaluminum chloride, methylaluminum dichloride, diethylaluminum chloride, ethylaluminum dichloride and dimethylaluminum chloride.

Preferably, the co-catalyst is triethylaluminum. The molar ratio of aluminum to titanium may be from about 5:1 to about 500:1 or from about 10:1 to about 200:1 or from about 15:1 to about 150:1 or from about 20:1 to about 100:1. The molar ratio of aluminum to titanium is preferably about 45:1.

The invention also relates to a process to make the catalyst system by contacting a Ziegler-Natta type procatalyst, a co-catalyst and the external electron donor according to the present invention. The procatalyst, the co-catalyst and the external donor can be contacted in any way known to the skilled person in the art; and as also described herein, more specifically as in the Examples.

The invention further relates to a process for making a polyolefin by contacting an olefin with the catalyst system according to the present invention. The procatalyst, the co-catalyst, the external donor and the olefin can be contacted in any way known to the skilled person in the art; and as also described herein.

For instance, the external donor in the catalyst system according to the present invention can be complexed with the co-catalyst and mixed with the procatalyst (pre-mix) prior to contact between the catalyst composition and the olefin. The external donor can also be added independently to the polymerization reactor. The procatalyst, the co-catalyst, and the external donor can be mixed or otherwise combined prior to addition to the polymerization reactor.

Contacting the olefin with the catalyst system according to the present invention can be done under standard polymerization conditions, known to the skilled person in the art. See for example Pasquini, N. (ed.) "Polypropylene handbook" $2^{nd}$ edition, Carl Hanser Verlag Munich, 2005. Chapter 6.2 and references cited therein.

The polymerization process may be a gas phase, a slurry or a bulk polymerization process, operating in one or more than one reactor. One or more olefin monomers can be introduced in a polymerization reactor to react with the catalyst composition and to form an olefin-based polymer (or a fluidized bed of polymer particles).

In the case of polymerization in a slurry (liquid phase), a dispersing agent is present. Suitable dispersing agents include for example propane, n-butane, isobutane, n-pentane, isopentane, hexane (e.g. iso- or n-), heptane (e.g. iso- or n-), octane, cyclohexane, benzene, toluene, xylene, liquid propylene and/or mixtures thereof. The polymerization such as for example the polymerization temperature and time, monomer pressure, avoidance of contamination of catalyst, choice of polymerization medium in slurry processes, the use of further ingredients (like hydrogen) to control polymer molar mass, and other conditions are well known to persons of skill in the art. The polymerization temperature may vary within wide limits and is, for example for propylene polymerization, between 0° C. and 120° C., preferably between 40° C. and 100° C. The pressure during (propylene) (co) polymerization is for instance between 0.1 and 6 MPa, preferably between 1-4 MPa.

Several types of polyolefins are prepared such as homopolyolefins, random copolymers and heterophasic polyolefin. The for latter, and especially heterophasic polypropylene, the following is observed.

Heterophasic propylene copolymers are generally prepared in one or more reactors, by polymerization of propylene and optionally one or more other olefins, for example ethylene, in the presence of a catalyst and subsequent polymerization of a propylene-α-olefin mixture. The resulting polymeric materials can show multiple phases (depending on monomer ratio), but the specific morphology usually depends on the preparation method and monomer ratio. The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; Polypropylene and other Polyolefins, by Ser van der Ven, Studies in Polymer Science 7, Elsevier 1990; WO06/010414, U.S. Pat. No. 4,399,054 and U.S. Pat. No. 4,472,524.

The molar mass of the polyolefin obtained during the polymerization can be controlled by adding hydrogen or any other agent known to be suitable for the purpose during the polymerization. The polymerization can be carried out in a continuous mode or batch-wise. Slurry-, bulk-, and gas-phase polymerization processes, multistage processes of each of these types of polymerization processes, or combinations of the different types of polymerization processes in a multistage process are contemplated herein. Preferably, the polymerization process is a single stage gas phase process or a multistage, for instance a two-stage gas phase process, e.g. wherein in each stage a gas-phase process is used or including a separate (small) prepolymerization reactor.

Examples of gas-phase polymerization processes include both stirred bed reactors and fluidized bed reactor systems; such processes are well known in the art. Typical gas phase olefin polymerization reactor systems typically comprise a reactor vessel to which an olefin monomer(s) and a catalyst system can be added and which contain an agitated bed of growing polymer particles. Preferably the polymerization process is a single stage gas phase process or a multistage, for instance a 2-stage, gas phase process wherein in each stage a gas-phase process is used.

As used herein, "gas phase polymerization" is the way of an ascending fluidizing medium, the fluidizing medium containing one or more monomers, in the presence of a catalyst through a fluidized bed of polymer particles maintained in a fluidized state by the fluidizing medium optionally assisted by mechanical agitation. Examples of gas phase polymerization are fluid bed, horizontal stirred bed and vertical stirred bed.

"fluid-bed," "fluidized," or "fluidizing" is a gas-solid contacting process in which a bed of finely divided polymer particles is elevated and agitated by a rising stream of gas optionally assisted by mechanical stirring. In a "stirred bed" upwards gas velocity is lower than the fluidization threshold.

A typical gas-phase polymerization reactor (or gas phase reactor) include a vessel (i.e., the reactor), the fluidized bed, a product discharge system and may include a mechanical stirrer, a distribution plate, inlet and outlet piping, a compressor, a cycle gas cooler or heat exchanger. The vessel may include a reaction zone and may include a velocity reduction zone, which is located above the reaction zone (viz. the bed). The fluidizing medium may include propylene gas and at least one other gas such as an olefin and/or a carrier gas such as hydrogen or nitrogen. The contacting can occur by way of feeding the catalyst composition into the polymerization reactor and introducing the olefin into the polymerization reactor. In an embodiment, the process includes contacting the olefin with a co-catalyst. The co-catalyst can be mixed with the procatalyst (pre-mix) prior to the introduction of the procatalyst into the polymerization reactor. The co-catalyst may be also added to the polymerization reactor independently of the procatalyst. The independent introduction of the co-catalyst into the polymerization reactor can occur (substantially) simultaneously with the procatalyst feed.

The olefin according to the invention may be selected from mono- and di-olefins containing from 2 to 40 carbon atoms. Suitable olefin monomers include alpha-olefins, such as ethylene, propylene, alpha-olefins having between 4 and 20 carbonatoms (viz. C4-20), such as 1-butene, 1-pentene, 1-hexene, 4-methyl-1-pentene, 1-heptene, 1-octene, 1-decene, 1-dodecene and the like; C4-C20 diolefins, such as 1,3-butadiene, 1,3-pentadiene, norbornadiene, 5-vinyl-2-norbornene (VNB), 1,4-hexadiene, 5-ethylidene-2-norbornene (ENB) and dicyclopentadiene; vinyl aromatic compounds having between 8 and 40 carbon atoms (viz. C8-C40) including styrene, o-, m- and p-methylstyrene, divinylbenzene, vinylbiphenyl, vinylnapthalene; and halogen-substituted C8-C40 vinyl aromatic compounds such as chlorostyrene and fluorostyrene.

Preferably, the olefin is propylene or a mixture of propylene and ethylene, to result in a propylene-based polymer, such as propylene homopolymer or propylene-olefin copolymer. The olefin may an alpha-olefin having up to 10 carbon atoms, such as ethylene, butane, hexane, heptane, octene. A propylene copolymer is herein meant to include both so-called random copolymers which typically have relatively low comonomer content, e.g. up to 10 mol. %, as well as so-called impact PP copolymers or heterophasic PP copolymers comprising higher comonomer contents, e.g. from 5 to 80 mol. %, more typically from 10 to 60 mol. %. The impact PP copolymers are actually blends of different propylene polymers; such copolymers can be made in one or two reactors and can be blends of a first component of low comonomer content and high crystallinity, and a second component of high comonomer content having low crystallinity or even rubbery properties. Such random and impact copolymers are well-known to the skilled in the art. A propylene-ethylene random copolymer may be produced in one reactor. Impact PP copolymers may be produced in two reactors: polypropylene homopolymer may be produced in a first reactor; the content of the first reactor is subsequently transferred to a second reactor into which ethylene (and optionally propylene) is introduced. This results in production of a propylene-ethylene copolymer (i.e. an impact copolymer) in the second reactor.

The present invention also relates to a polyolefin, preferably a polypropylene obtained or obtainable by a process, comprising contacting an olefin, preferably propylene or a mixture of propylene and ethylene with the procatalyst according to the present invention. The terms polypropylene and propylene-based polymer are used herein interchangeable. The polypropylene may be a propylene homopolymer or a mixture of propylene and ethylene, such as a propylene-based copolymer, e.g. heterophasic propylene-olefin copolymer; random propylene-olefin copolymer, preferably the olefin in the propylene-based copolymers being a C2, or C4-C6 olefin, such as ethylene, butylene, pentene or hexene. Such propylene-based (co)polymers are known to the skilled person in the art; they are also described herein above.

The present invention also relates to a polyolefin, preferably a propylene-based polymer obtained or obtainable by a process as described herein above, comprising contacting propylene or a mixture of propylene and ethylene with a catalyst system according to the present invention.

In one embodiment the present invention relates to the production of a homopolymer of polypropylene. For such a polymer, properties such as isotacticity and stiffness and emission may be important.

In one embodiment according to the present invention a (random) copolymer of propylene and ethylene monomers is obtained. For such a polymer, properties such as Xs and reduced haze increase after time may be important.

In one embodiment according to the present invention a heterophasic polypropylene having a matrix phase or either homopolymer of polypropylene or a random copolymer of propylene and ethylene and a dispersed phase of ethylene propylene rubber. This is called "impact polypropylene". For such a polymer, properties such as stiffness (related to the flexural modulus) and impact may be important.

The content of the comonomer used in addition to propylene (e.g. ethylene or C4-C6-olefin) may vary between 0 and 8 wt. % based on the total weight of the polymer, preferably between 1 and 4 wt. %.

"comonomer content" or "C2 content" in the context of the present invention means the weight percentage (wt. %) of respectively comonomer or ethylene incorporated incorporated into the total polymer weight obtained and measured with FT-IR. The FT-IR method was calibrated using NMR data.

Several polymer properties are discussed here.

The polyolefin, preferably the polypropylene according to the present invention has a molecular weight distribution higher than 3.5, preferably higher than 4, more preferably higher than 4.5 and for instance below 10 or below 9 or even below 6. The molecular weight distribution of the polyolefins, preferably polypropylene according to the present invention is for instance between 3.5 and 9, preferably between 4 and 6, more preferably between 4.5 and 6.

Xylene soluble fraction (XS) is preferably from about 0.5 wt. % to about 10 wt. %, or from about 1 wt. % to about 8 wt. %, or between 2 and 6 wt. %, or from about 1 wt. % to about 5 wt. %. Preferably, the xylene amount (XS) is lower than 6 wt. %, preferably lower than 5 wt. %, more preferably lower than 4 wt. % or even lower than 3 wt. % and most preferably lower than 2.7 wt. %.

The production rate is preferably from about 1 kg/g/hr to about 100 kg/g/hr, or from about 10 kg/g/hr to about 40 kg/g/hr.

MFR is preferably from about 0.01 g/10 min to about 2000 g/10 min, or from about 0.01 g/10 min to about 1000 g/10 min; or from about 0.1 g/10 min to about 500 g/10 min, or from about 0.5 g/10 min to about 150 g/10 min, or from about 1 g/10 min to about 100 g/10 min.

The olefin polymer obtained in the present invention is considered to be a thermoplastic polymer. The thermoplastic polymer composition according to the invention may also contain one or more of usual additives, like those mentioned above, including stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; impact modifiers; blowing agents; fillers and reinforcing agents; and/or components that enhance interfacial bonding between polymer and filler, such as a maleated polypropylene, in case the thermoplastic polymer is a polypropylene composition. The skilled person can readily select any suitable combination of additives and additive amounts without undue experimentation.

The amount of additives depends on their type and function; typically is of from 0 to about 30 wt. %; preferably of from 0 to about 20 wt. %; more preferably of from 0 to about 10 wt. % and most preferably of from 0 to about 5 wt. % based on the total composition. The sum of all components added in a process to form the polyolefins, preferably the propylene-base polymers or compositions thereof should add up to 100 wt. %.

The thermoplastic polymer composition of the invention may be obtained by mixing one or more of the thermoplastic polymers with one or more additives by using any suitable means. Preferably, the thermoplastic polymer composition of the invention is made in a form that allows easy processing into a shaped article in a subsequent step, like in pellet or granular form. The composition can be a mixture of different particles or pellets; like a blend of a thermoplastic polymer and a master batch of nucleating agent composition, or a blend of pellets of a thermoplastic polymer comprising one of the two nucleating agents and a particulate comprising the other nucleating agent, possibly pellets of a thermoplastic polymer comprising said other nucleating agent. Preferably, the thermoplastic polymer composition of the invention is in pellet or granular form as obtained by mixing all components in an apparatus like an extruder; the advantage being a composition with homogeneous and well-defined concentrations of the nucleating agents (and other components).

The invention also relates to the use of the polyolefins, preferably the propylene-based polymers (also called polypropylenes) according to the invention in injection molding, blow molding, extrusion molding, compression molding, casting, thin-walled injection molding, etc. for example in food contact applications.

Furthermore, the invention relates to a shaped article comprising the polyolefin, preferably the propylene-based polymer according to the present invention.

The polyolefin, preferably the propylene-based polymer according to the present invention may be transformed into shaped (semi)-finished articles using a variety of processing techniques. Examples of suitable processing techniques include injection molding, injection compression molding, thin wall injection molding, extrusion, and extrusion compression molding. Injection molding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection molding may for example be used to make thin wall packaging applications both for food and non-food segments. This includes pails and containers and yellow fats/margarine tubs and dairy cups.

It is noted that the invention relates to all possible combinations of features recited in the claims. Features described in the description may further be combined.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention will be further elucidated with the following examples without being limited hereto.

EXAMPLES

Diethylamino triethoxysilane (DEATES) is an external electron donor that was synthesized according to Example 1 of U.S. Pat. No. 7,238,758 B2 which is incorporated by reference.

Procatalyst I Preparation

A. Grignard Formation Step

A stirred flask, fitted with a reflux condenser and a funnel, was filled with magnesium powder (24.3 g). The flask was brought under nitrogen. The magnesium was heated at 80° C. for 1 hour, after which dibutyl ether (DBE) (150 ml), iodine (0.03 g) and n-chlorobutane (4 ml) were successively added. After the colour of the iodine had disappeared, the temperature was raised to 80° C. and a mixture of n-chlorobutane (110 ml) and DBE (750 ml) was slowly added for 2.5 hours. The reaction mixture was stirred for another 3 hours at 80° C. Then the stirring and heating were stopped and the small amount of solid material was allowed to settle for 24 hours. By decanting the colorless solution above the precipitate, a solution of butylmagnesiumchloride (reaction product of step A) with a concentration of 1.0 mol Mg/l was obtained.

B. Preparation of the Intermediate Reaction Product 250 mL of dibutyl ether was introduced to a 1 L reactor fitted with a propeller stirrer and two baffles. The reactor was thermostated at 35° C. and the stirrer speed was kept at 200 rpm. Then a cooled (to 15° C.) 360 mL solution of the Grignard reaction product as prepared in A and 180 ml of a cooled (to 15° C.) solution of 38 ml of tetraethoxysilane (TES) in 142 ml of DBE were dosed into the reactor for 400 min. with preliminary mixing in a minimixer of 0.15 ml volume, which was cooled to 15° C. by means of cold water circulating in the minimixer jacket. The premixing time was 18 seconds in the minimixer and the connecting tube between the minimixer and the reactor. The stirring speed in the minimixer was 1000 rpm. On the dosing completion, the reaction mixture was kept at 35° C. for 0.5 hours. Then the reactor was heated to 60° C. and kept at this temperature for 1 hour. Then the stirrer was stopped and the solid substance was allowed to settle. The supernatant was removed by decanting. The solid substance was washed three times using 300 ml of heptane. As a result, a white solid reaction product was obtained and suspended in 200 ml of heptane.

Under an inert nitrogen atmosphere at 20° C. a 250 ml glass flask equipped with a mechanical agitator is filled with a slurry of 5 g of the reaction product of step B dispersed in 60 ml of heptane. Subsequently, a solution of 0.86 ml methanol (MeOH/Mg=0.5 mol) in 20 ml heptane is dosed under stirring during 1 hour. After keeping the reaction mixture at 20° C. for 30 minutes the slurry was slowly allowed to warm up to 30° C. for 30 min and kept at that temperature for another 2 hours. Finally the supernatant liquid is decanted from the solid reaction product which was washed once with 90 ml of heptane at 30° C.

C. Preparation of the Procatalyst Component

A reactor was brought under nitrogen and 125 ml of titanium tetrachloride was added to it. The reactor was heated to 90° C. and a suspension, containing about 5.5 g of the support obtained in step C in 15 ml of heptane, was added to it under stirring. The reaction mixture was kept at 90° C. for 10 min. Then ethyl benzoate (EB) was added (EB/Mg=0.15 molar ratio). The reaction mixture was kept for 60 min. Then the stirring was stopped and the solid substance was allowed to settle. The supernatant was removed by decanting, after which the solid product was washed with chlorobenzene (125 ml) at 90° C. for 20 min. The washing solution was removed by decanting, after which a mixture of titanium tetrachloride (62.5 ml) and chlorobenzene (62.5 ml) was added. The reaction mixture was kept at 90° C. for 30 min. After which the stirring was stopped and the solid substance was allowed to settle. The supernatant was removed by decanting, after which a mixture of titanium tetrachloride (62.5 ml) and chlorobenzene (62.5 ml) was added. Then di-n-butyl phthalate (DNB) (DNB/Mg=0.15 molar ratio) in 3 ml of chlorobenzene was added to reactor and the temperature of reaction mixture was increased to 115° C. The reaction mixture was kept at 115° C. for 30 min. After which the stirring was stopped and the solid substance was allowed to settle. The supernatant was removed by decanting, after which a mixture of titanium tetrachloride (62.5 ml) and chlorobenzene (62.5 ml) was added. The reaction mixture was kept at 115° C. for 30 min, after which the solid substance was allowed to settle. The supernatant was removed by decanting and the solid was washed five times using 150 ml of heptane at 60° C., after which the procatalyst component, suspended in heptane, was obtained.

Procatalyst II Preparation (Comparative)

Procatalyst II was prepared according to the method disclosed in U.S. Pat. No. 4,866,022. This patent discloses a catalyst component comprising a product formed by: A. forming a solution of a magnesium-containing species from a magnesium carbonate or a magnesium carboxylate; B. precipitating solid particles from such magnesium-containing solution by treatment with a transition metal halide and an organosilane having a formula: RnSiR'4−n, wherein n=0 to 4 and wherein R is hydrogen or an alkyl, a haloalkyl or aryl radical containing one to about ten carbon atoms or a halosilyl radical or haloalkylsilyl radical containing one to about eight carbon atoms, and R' is OR or a halogen: C. reprecipitating such solid particles from a mixture containing a cyclic ether; and D. treating the reprecipitated particles with a transition metal compound and an electron donor. This process for preparing a catalyst component is incorporated into the present application by reference.

Procatalyst III Preparation (Comparative)

WO03/068828 discloses a process for preparing a catalyst component on page 91 "preparation of solid catalyst components" which section is incorporated into the present application by reference. Magnesium chloride, toluene, epoxy chloropropane and tributyl phosphate were added under nitrogen to a reactor, followed by heating. Then phthalic anhydride was added. The solution was cooled to −25° C. and TiCl$_4$ was added drop wise, followed by heating. An internal donor was added (1,3-diphenyl-1,3-propylene glycol dibenzoate, 2-methyl-1,3-diphenyl-1,3-propylene glycol dibenzoate, 1,3-diphenyl-1,3-propyleneglycol diproprionate, or 1,3-diphenyl-2-methyl-1,3-propylene glycol diproprionate) and after stirring a solid was obtained and washed. The solid was treated twice with a toluene solution of TiCl$_4$ followed by washing with toluene to obtain said catalyst component.

Procatalyst IV Preparation (Comparative)

U.S. Pat. No. 4,771,024 discloses the preparation of a procatalyst in column 10, line 61 to column 11, line 9. The section "catalyst manufacture on silica" is incorporated into the present application by reference. The process comprises combining dried silica with carbonated magnesium solution (magnesium diethoxide in ethanol was bubbled with $CO_2$). The solvent was evaporated at 85° C. The resulting solid was washed and a 50:50 mixture of titanium tetrachloride and chlorobenzene was added to the solvent together with ethylbenzoate. The mixture was heated to 100° C. and liquid filtered. Again $TiCl_4$ and chlorobenzene were added, followed by heating and filtration. A final addition of $TiCl_4$ and chlorobenzene and benzoylchloride was carried out, followed by heating and filtration. After washing the procatalyst was obtained.

Batch-Wise Production of Propylene Homopolymers.

Propylene polymerization experiments (Table 1) were performed using procatalyst I described above. Triethylaluminum was used as co-catalyst, and DiPDMS and DEATES were employed as external donors. Experiments were performed at different $H_2/C_3$ molar ratios.

The polymerization reaction was carried out in a stainless steel reactor with a volume of 1800 mL. Under a nitrogen atmosphere, the co-catalyst (TEAL) and procatalyst synthesized according to the procedure described above and the external electron donor were dosed to the reactor as heptane solutions or slurries. 10-15 mg of procatalyst were employed. The molar ratio of co-catalyst to titanium (from the procatalyst) was set to 160, and the Si/Ti ratio was set to 9. During this dosing, the reactor temperature was maintained below 30° C. Subsequently, the reactor was pressurized using a set ratio of propylene and hydrogen, and the temperature and pressure were raised to its setpoint (70° C. and 20 barg). After the pressure setpoint has been reached, the polymerization was continued for 60 minutes (i.e. polymerization time=60 minutes). During the polymerization reaction the gas cap composition of propylene and hydrogen was controlled using mass flow meters and online-GC control. After reaching the polymerization time the reactor was depressurized and cooled to ambient conditions. The propylene polymer so obtained was removed from the reactor and stored in aluminum bags.

Batch-Wise Production of Propylene-Ethylene Co-Polymers

The copolymerization of propylene and ethylene was carried out in a stainless steel reactor with a volume of 1800 mL. The co-catalyst (TEAL), procatalyst components and the external electron donor (silane compound) were dosed as heptane solutions or slurries to the reactor, which is under a nitrogen atmosphere, while the reactor temperature is maintained below 30° C. Subsequently, the reactor was pressurized using a set ratio of propylene, ethylene and hydrogen, and the temperature and pressure were raised to its setpoint (60° C. and 20 barg). After the pressure setpoint has been reached, the polymerization was continued for 75 minutes. During the polymerization reaction the gas cap composition of propylene, ethylene and hydrogen was controlled using mass flow meters and online-GC control. After reaching the polymerization time the reactor was depressurized and cooled to ambient conditions. The propylene-ethylene random copolymer so obtained was removed from the reactor and stored in aluminum bags.

Abbreviations and Measuring Methods:

PP yield, kg/g cat is the amount of polypropylene obtained per gram of catalyst component.

$H_2/C_3$ is the molar ratio of hydrogen to propylene in the gas cap of the reactor, measured by on-line gas chromatography.

Oligomer content refers to the amount in ppm in a polymer sample of the alpha-olefin C6-C33 oligomers, which typically originate from the low molecular weight material in the polymer composition. A weighed off sample of 50-100 mg of the produced polymer strand was loaded into an inert metal tube. This tube was briefly purged at room temperature using helium. The tube was heated to 200° C. and a carrier gas was passed over the molten polymer sample for 30 minutes. Upon exiting the tube, the carrier gas was passed through a cold trap, condensing the volatile components liberated from the polymer. Subsequently, the cold trap was rapidly heated to 250° C. and the volatiles were injected into a CP-SIL5 GC column (25 meter). Identification of the individual components was performed using a MS detector and quantification was performed using a FID detector.

TABLE 1

Batch propylene homopolymerization results.

| Exp # nr | Procat. | External Donor | PP Yield (Kg/g cat) | MFR (dg/min) | $H_2/C_3$ (mol:mol) | Oligomer content (ppm) |
|---|---|---|---|---|---|---|
| CE1 | I | DiPDMS | 22.71 | 44.60 | 0.0582 | 1589 |
| *1 | I | DEATES | 16.98 | 43.31 | 0.0272 | 1340 |
| *2 | I | DEATES | 17.09 | 64.10 | 0.0342 | 1505 |
| CE2 | II | DiPDMS | 11.77 | 44.84 | 0.0647 | 1735 |
| CE2 | II | DEATES | 12.49 | 47.71 | 0.0265 | 1430 |
| CE4 | II | DiPDMS | 15.79 | 74.71 | 0.0814 | 2286 |
| CE5 | II | DiPDMS | 14.89 | 81.95 | 0.0869 | 2146 |
| CE6 | II | DEATES | 11.81 | 70.00 | 0.0378 | 1780 |
| CE7 | II | DiPDMS | 12.09 | 127.9 | 0.1271 | 2415 |
| CE8 | II | DEATES | 8.83 | 193.0 | 0.0781 | 2219 |

*Polymerization time 75 min. in stead of 60 min.
DiPDMS = diisopropyl dimethoxysilane,
DEATES = diethylamino triethoxysilane.

Table 1 above shows that comparing the homopolymers made using procatalyst I and the DEATES external donor provides homopolymer compositions with lower oligomer content at similar MFR and that high MFR homopolymers can be made applying a much lower $H_2/C_3$ ratio in the reactor.

Semi-Continuous Preparation of Propylene Homopolymer and Heterophasic Copolymer

Gas-phase polymerizations were performed in a set of two horizontal, cylindrical reactors in series, wherein a propylene homopolymer was formed in the first reactor and an ethylene-propylene copolymer rubber in the second one to prepare an impact copolymer. The first reactor was operated in a continuous way, the second one in a batch manner. In the synthesis of the homopolymer, the polymer was charged into the secondary reactor blanketed with nitrogen. The first reactor was equipped with an off-gas port for recycling reactor gas through a condenser and back through a recycle line to the nozzles in the reactor. Both reactors had a volume of one gallon (3.8-liter) measuring 10 cm in diameter and 30 cm in length. In the first reactor liquid propylene was used as the quench liquid; for the synthesis of copolymers the temperature in the second reactor was kept constant by a cooling jacket. Procatalysts I and II were introduced into the first reactor as a 5-7 weight percent slurry in hexane through a liquid propylene-flushed catalyst addition nozzle.

External donor and TEAL in hexane were fed to the first reactor through a different liquid propylene flushed addition nozzle. For the production of heterophasic polymer, an Al/Mg ratio of 9 and Al/Si ratio of 13.5 was used.

During operation, polypropylene powder produced in the first reactor passed over a weir and was discharged through a powder discharge system into the second reactor. The polymer bed in each reactor was agitated by paddles attached to a longitudinal shaft within the reactor that was rotated at about 50 rpm in the first and at about 75 rpm in the second reactor. The reactor temperature and pressure were maintained at 61° C. and 2.2 MPa in the first and for the copolymer synthesis at 66° C. and 2.2 MPa in the second reactor. The production rate was about 200-250 g/h in the first reactor in order to obtain a stable process. For the homopolymer synthesis the hydrogen concentration in the off gas was controlled such to achieve the targeted melt flow rate (MFR). For the copolymer synthesis, hydrogen was fed to the reactor to control a melt flow rate ratio over the homopolymer powder and copolymer powder. The composition of the ethylene-propylene copolymer (RCC2) was controlled by adjusting the ratio ethylene and propylene (C2/C3) in the recycling gas in the second reactor based on gas chromatography analysis. In this respect, RCC2 is the amount of ethylene incorporated in the rubber fraction (weight percent) and RC is the amount of rubber incorporated in the impact copolymer (weight percent). RC and RCC2 were measured with IR spectroscopy, which was calibrated using $^{13}$C-NMR according to known procedures.

Abbreviations and Measuring Methods:

Al/Mg is the molar ratio of aluminum (of the co-catalyst) to magnesium (of the procatalyst) added to the reactor.

Si/Mg is the molar ratio of silicon (of the external donor) to magnesium (of the procatalyst) to the reactor Si/Ti is the molar ratio of silicon (of the external donor) to titanium (of the procatalyst) to the reactor.

$H_2/C_3$ is the molar ratio of hydrogen to propylene in the gas cap of the reactor, measured by on-line gas chromatography.

Table 3 shows that for the production of heterophasic polypropylene a much lower H2/C3 ratio can be used using the DEATES donor than DiPDMS and therefore higher MFR heterophasic polypropylenes can be made using this donor. Moreover, the C2/C3 ratio in the second reactor can be much lower in the second reactor using the DEATES donor in order to achieve a high RCC2 in the ethylene-propylene copolymer that is made in the second reactor. Therefore, DEATES shows a higher hydrogen and a higher ethylene sensitivity.

Evaluation of Properties

For the evaluation of the properties, polymer powder was premixed with the additives (amounts in final product: 2500 ppm heat stabilizer, 2500 ppm process stabilizer, 900 ppm Ca stearate, 1000 ppm anti-static agent and 2500 ppm clarifier) and compounded in a mini compounder to give a polymer composition. The following properties of the polymer composition were measured:

Haze plaques: the polymer composition was injection molded at a melt temperature of 220° C. and a mould temperature=20° C.

Mechanical property bars (for the determination of flexural modulus and Izod) were prepared from the polymer composition by injection molding under the following conditions: Barrel temperature=230° C., Mould temperature=45° C.

TABLE 2

Semi-continuous homopolymerization data using procatalyst I.

| Exp. Nr. | Donor | Al/Mg Mol:mol | Si/Mg Mol:mol | Si/Ti Mol:mol | $H_2/C_3$ Mol:mol | MFR dg/min | XS |
|---|---|---|---|---|---|---|---|
| CE9 | DIPDMS | 9.0 | 0.7 | 14.1 | 0.0116 | 4.5 | 1.8 |
| 3 | DEATES | 9.0 | 0.7 | 14.1 | 0.0038 | 4.5 | 2.6 |
| 4 | DEATES | 9.0 | 0.7 | 14.1 | 0.0288 | 60.0 | n.d. |

Donor = external donor;
DiPDMS = diisopropyl dimethoxysilane,
DEATES = diethylamino triethoxysilane.

Table 2 shows that in case of DEATES a much lower H2/C3 ratio in the reactor can be applied to obtain a higher MFR homopolymer.

TABLE 3

Semi-continuous production of heterophasic polypropylene using procatalyst I.

| | | Homopolymerization stage | | | Propylene-ethylene copolymerization stage | | | | |
|---|---|---|---|---|---|---|---|---|---|
| Exp. Nr. | Donor | $H_2/C_3$ mol/mol | MFR dg/min | Activity Kg pol./ g cat | $H_2$ % | $C_2/C_3$ mol/ mol | Killing agent (nl/hour) | MFR dg/min | $RCC_2$ % | RC % |
| CE10 | DiPDMS | 0.0116 | 4.5 | 44.2 | 0.45 | 0.85 | 530 (0.5) | 1.45 | 55.0 | 24.5 |
| 5 | DEATES | 0.0288 | 60.0 | 36.4 | 1.70 | 0.42 | 280 (1.0) | 20.0 | 55.0 | 24.5 |
| 6 | DEATES | 0.0038 | 4.5 | 33.1 | 0.50 | 0.45 | 420 (1.0) | 1.45 | 55.0 | 24.5 |

Donor = external donor;
DiPDMS = diisopropyl dimethoxysilane,
DEATES = diethylamino triethoxysilane.

TABLE 4

Properties of composition comprising propylene-ethylene copolymers prepared using different procatalysts. For all examples, DEATES was used as external donor.

| Ex. # | Pro Cat | Si/Ti mol/ mol | MFR dg/min polymer powder | MFR dg/min | $C_2$ wt. % | XS wt. % | Izod | Flex mod | Haze day 0 | Haze day 21 | Haze inc. |
|---|---|---|---|---|---|---|---|---|---|---|---|
| 1 | I | 9.0 | 28.6 | 26 | 4.1 | 6.9 | 4.23 | 1240 | 11 | 18 | 7 |
| 2 | I | 4.7 | 31.9 | 29 | 3.9 | 6.5 | 4.61 | 1261 | 11 | 21 | 10 |
| 3 | I | 4.5 | 30.0 | 29 | 3.6 | 6.4 | 4.45 | 1277 | 11 | 22 | 10 |
| 4 | I | 9.1 | 23.6 | 21 | 3.8 | 5.7 | 4.64 | 1263 | 11 | 19 | 7.8 |
| 5 | I | 9.0 | 27.7 | 19 | 4.0 | 4.7 | 4.67 | 1252 | 7.8 | 14 | 6 |
| 6 | I | 9.0 | 29.4 | 37 | 4.1 | 5.2 | 4.6 | 1220 | 9 | 18 | 8.9 |
| 7* | IV | 4.5 | 45.0 | 43 | 5.0 | 12.5 | 5.79 | 1025 | 9.8 | 32 | 22 |
| 8* | IV | 4.5 | 43.0 | 44 | 3.8 | 5.9 | 4.4 | 1308 | 12 | 26 | 13 |
| 9* | III | 4.6 | 23.2 | 21 | 4.2 | 8.5 | 4.79 | 1142 | 9.8 | 19 | 8.8 |

*comparative examples

The MWD was determined for Example no. 5, being 5.1; for Example no. 8, being 4.7 and for Example no. 9, being 6.2.

The Al/Ti mol/mol ratio was 50 for Examples nos 1, 2, 3, 4, 7, 8, and 9; it was 100 for Example no. 5 and it was 160 for Example no. 6.

As can be seen from the above table 4, by using the procatalyst prepared by the process of claim 6, a composition can be obtained, which composition shows a low xylene soluble content in combination with low blooming, while maintaining the mechanical properties. Blooming is not desired, since it will negatively affect the optical appearance of an article prepared with said composition.

Therefore, the invention also relates to a composition comprising a propylene-ethylene copolymer having a xylene soluble content (XS) of less than 7.5 wt. %, wherein the XS is measured according to ASTM D 5492-10 and having a haze increase over 21 days at 50° C. of less than 12, for example less than 11, wherein the haze increase over 21 days at 50° C. is the difference between the haze value of the sample before heating and the haze value after heating the sample at 50° C. for 21 days and wherein the haze value is measured on a BYK Gardner according to ASTM D 1003-00, wherein the amount of ethylene in the propylene-ethylene copolymer is in the range from 1 to 8 wt. %, preferably in the range from 2 to 6, for example in the range from 3 to 4.5 wt. % based on the propylene-ethylene copolymer. Preferably, said composition has a molecular weight distribution in the range from 4 to 6.5, for example in the range from 5 to 6 and/or preferably said composition has a melt flow rate measured according to ISO 1133:2005 at 230° C. with 2.16 kg load in the range from 5 to 100, for example in the range from 10 to 100, for example in the range from 10 to 35, wherein the molecular weight distribution (MWD) was determined by Waters 150° C. gel permeation chromatograph combined with a Viscotek 100 differential viscosimeter. The chromatograms were run at 140° C. using 1,2,4-trichlorobenzene as a solvent with a flow rate of 1 ml/min. The refractive index detector was used to collect the signal for molecular weights.

Statics are observed visually by inspecting the wall of the reactor. The following criteria are used:
1: no statics observed, meaning that polymer powder was neither visible on the stirrer nor on the reactor walls (after opening of the reactor)
2: statics observed, meaning polymer powder was visible on the stirrer and/or on the reactor walls (after opening of the reactor)

When DEATES is used for the polymerization of a polyolefin, preferably a propylene polymer, statics in the reactor are significantly reduced.

Such composition may suitably be used in injection molding for instance for the manufacture of shaped articles.

The invention claimed is:

1. A process for the preparation of a catalyst system suitable for olefin polymerization, wherein the process comprises:
   A) providing a procatalyst obtained via a process comprising:
      i) contacting a compound $R^4{}_z MgX^4{}_{2-z}$ with an alkoxy- or aryloxy-containing silane compound to give a first intermediate reaction product, being a solid $Mg(OR^1)_x X^1{}_{2-x}$, wherein: $R^4$ is the same as $R^1$ being a linear, branched or cyclic hydrocarbyl group independently selected from alkyl, alkenyl, aryl, aralkyl or alkylaryl groups, and one or more combinations thereof; wherein said hydrocarbyl group is substituted or unsubstituted, optionally comprises one or more heteroatoms and has between 1 and 20 carbon atoms; $X^4$ and $X^1$ are each independently selected from fluoride ($F^-$), chloride ($Cl^-$), bromide ($Br^-$) or iodide ($I^-$); and z is in a range of larger than 0 and smaller than 2, being 0<z<2;
      ii) optionally contacting the solid $Mg(OR^1)_x X^1{}_{2-x}$ obtained in step i) with at least one activating compound selected from activating electron donors and metal alkoxide compounds of formula $M^1(OR^2)_{v-w}(OR^3)_w$ or $M^2(OR^2)_{v-w}(R^3)_w$, to obtain a second intermediate product; wherein $M^1$ is a metal selected from Ti, Zr, Hf, Al or Si; $M^2$ is a metal being Si; v is the valency of $M^1$ or $M^2$, w is smaller than v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group is substituted or unsubstituted, optionally contains one or more heteroatoms, and has between 1 and 20 carbon atoms;
      iii) contacting the first or second intermediate reaction product, obtained respectively in step i) or ii), with a halogen-containing Ti-compound, an internal electron donor, and optionally, an activator to obtain said procatalyst; and
   B) contacting said procatalyst with a co-catalyst and the at least one external electron donor that is diethylaminotriethoxysilane, wherein the internal electron donor is an aminobenzoate according to formula XI

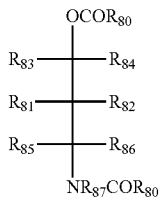

Formula XI wherein $R_{80}$, $R_{81}$, $R_{82}$, $R_{83}$, $R_{84}$, $R_{85}$, and $R_{86}$ are independently selected from a group consisting of hydrogen, $C_1$-$C_{10}$ straight and branched alkyl; $C_3$-$C_{10}$ cycloalkyl; $C_6$-$C_{10}$ aryl; and $C_7$-$C_{10}$ alkaryl and aralkyl group;

wherein when one of $R_{83}$ and $R_{84}$ and one of $R_{85}$ and $R_{86}$ has at least one carbon atom, then the other one of $R_{83}$ and $R_{84}$ and of $R_{85}$ and $R_{86}$ is each a hydrogen atom;

wherein $R_{87}$ is selected from hydrogen, methyl, ethyl, propyl, isopropyl, butyl, t-butyl, phenyl, benzyl, substituted benzyl and halophenyl groups; and wherein $R_{88}$ is selected from the group consisting of $C_6$-$C_{10}$ aryl; and $C_7$-$C_{10}$ alkaryl and aralkyl groups.

2. The process according to claim 1, wherein the process is essentially phthalate free.

3. The process according to claim 1, wherein
$R_{83}$, $R_{84}$, $R_{85}$ and $R_{86}$ are independently selected from $C_1$-$C_{10}$ straight and branched alkyl and phenyl; and
$R_{88}$ is a substituted or unsubstituted phenyl, benzyl, naphthyl, ortho-tolyl, para-tolyl or anisol group.

4. The process according to claim 3, wherein
$R_{83}$, $R_{84}$, $R_{85}$ and $R_{86}$ are independently selected from methyl, ethyl, propyl, isopropyl, butyl, t-butyl, and phenyl groups; and
$R_{88}$ is phenyl.

5. The process according to claim 1, wherein the internal electron donor is selected from 4-[benzoyl(methyl)amino]pentan-2-yl benzoate; 2,2,6,6-tetramethyl-5-(methylamino)heptan-3-ol dibenzoate; 4-[benzoyl (ethyl)amino]pentan-2-yl benzoate, 4-(methylamino)pentan-2-yl bis(4-methoxy)benzoate), 3-[benzoyl(cyclohexyl)amino]-1-phenylbutyl benzoate, 3-[benzoyl(propan-2-yl)amino]-1-phenylbutyl, 4-[benzoyl(methyl)amino]-1,1,1-trifluoropentan-2-yl, 3-(methylamino)-1,3-diphenylpropan-1-ol dibenzoate, 3-(methyl)amino-propan-1-ol dibenzoate; 3-(methyl)amino-2,2-dimethylpropan-1-ol dibenzoate, and 4-(methylamino)pentan-2-yl bis(4-methoxy)benzoate).

6. The process according to claim 1, wherein the activator is present and is added prior to or simultaneously with the addition to the internal electron donor.

7. The process according to claim 6, wherein the activator is a benzamide according to formula X

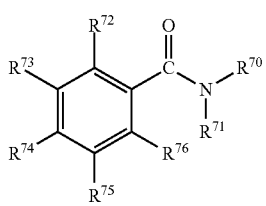

Formula X wherein:
$R^{70}$ and $R^{71}$ are each independently selected from hydrogen or an alkyl; and
$R^{72}$, $R^{73}$, $R^{74}$, $R^{75}$, $R^{76}$ are each independently selected from hydrogen, a heteroatom such as a halide, or a hydrocarbyl group selected from alkyl, alkenyl, aryl, aralkyl, alkoxycarbonyl or alkylaryl groups, and one or more combinations thereof.

8. The process according to claim 7, wherein $R^{70}$ and $R^{71}$ are each independently selected from hydrogen and an alkyl having between 1 and 6 carbon atoms.

9. The process according to claim 8 wherein the activator is N, N-dimethylbenzamide.

10. The process according to claim 7, wherein the benzamide according to formula X is present in the procatalyst in an amount from 0.1 to 4 wt. % as determined using HPLC.

11. A catalyst system obtained by the process of claim 1.

12. A process for preparing a polyolefin, comprising contacting at least one olefin with the catalyst system according to claim 11.

13. The process according to claim 12, wherein the olefin is propylene or a combination of propylene and ethylene.

14. The process of claim 1, wherein
the activator is present and is added prior to or simultaneously with the addition to the internal electron donor, wherein the activator is a benzamide according to formula X

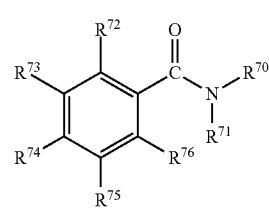

Formula X wherein:
$R^{70}$ and $R^{71}$ are each independently selected from hydrogen or an alkyl; and
$R^{72}$, $R^{73}$, $R^{74}$, $R^{75}$, $R^{76}$ are each independently selected from hydrogen, a heteroatom such as a halide, or a hydrocarbyl group selected from alkyl, alkenyl, aryl, aralkyl, alkoxycarbonyl or alkylaryl groups, and one or more combinations thereof; and
wherein the benzamide according to formula X is present in the procatalyst in an amount from 0.1 to 3 wt. % as determined using HPLC.

15. The process of claim 14, wherein
the internal electron donor is selected from 4-[benzoyl (methyl)amino]pentan-2-yl benzoate; 2,2,6,6-tetramethyl-5-(methylamino)heptan-3-ol dibenzoate; 4-[benzoyl (ethyl)amino]pentan-2-yl benzoate, 4-(methylamino)pentan-2-yl bis(4-methoxy)benzoate), 3-[benzoyl(cyclohexyl)amino]-1-phenylbutyl benzoate, 3-[benzoyl(propan-2-yl)amino]-1-phenylbutyl, 4-[benzoyl(methyl)amino]-1,1,1-trifluoropentan-2-yl, 3-(methylamino)-1,3-diphenylpropan-1-ol dibenzoate, 3-(methyl)amino-propan-1-ol dibenzoate; 3-(methyl)amino-2,2-dimethylpropan-1-ol dibenzoate, and 4-(methylamino)pentan-2-yl bis(4-methoxy)benzoate); and
the activator is N, N-dimethylbenzamide, and is present in the procatalyst an amount from 0.1 to 1.5 wt. % as determined using HPLC.

16. A catalyst system obtained by the process of claim 14.

17. A process for preparing a polypropylene or a propylene-ethylene copolymer, comprising contacting propylene or a combination of propylene and ethylene with the catalyst system according to claim 15.

* * * * *